US012561081B2

(12) United States Patent
Yoshida et al.

(10) Patent No.: US 12,561,081 B2
(45) Date of Patent: Feb. 24, 2026

(54) STORAGE SYSTEM FOR REMOTE COPY AND PATH SELECTION METHOD FOR REMOTE COPY

(71) Applicant: Hitachi, Ltd., Tokyo (JP)

(72) Inventors: Misato Yoshida, Tokyo (JP); Takahiro Yamamoto, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 94 days.

(21) Appl. No.: 18/588,129

(22) Filed: Feb. 27, 2024

(65) Prior Publication Data

US 2025/0156103 A1     May 15, 2025

(30) Foreign Application Priority Data

Nov. 14, 2023    (JP) ................................. 2023-193609

(51) Int. Cl.
*G06F 3/06*          (2006.01)
(52) U.S. Cl.
CPC ............ *G06F 3/065* (2013.01); *G06F 3/0617* (2013.01); *G06F 3/0683* (2013.01)
(58) Field of Classification Search
CPC ....... G06F 3/065; G06F 3/0617; G06F 3/0683
See application file for complete search history.

(56) References Cited

U.S. PATENT DOCUMENTS

| | | | | |
|---|---|---|---|---|
| 6,643,795 | B1 * | 11/2003 | Sicola ................. | G06F 11/2079 |
| | | | | 714/E11.073 |
| 2010/0191926 | A1 * | 7/2010 | Hara ................... | G06F 11/2069 |
| | | | | 711/E12.103 |
| 2018/0032254 | A1 | 2/2018 | Okada et al. | |
| 2019/0266002 | A1 * | 8/2019 | Nishikawa ................ | G06F 3/06 |

FOREIGN PATENT DOCUMENTS

WO         2016/194096  A1    12/2016

* cited by examiner

*Primary Examiner* — Eric Cardwell
(74) *Attorney, Agent, or Firm* — Volpe Koenig

(57) ABSTRACT

An object of the invention is to reduce a performance decrease in remote copy performed between a second storage system and a first storage system including a plurality of nodes. For each of a plurality of paths between the first and second storage systems, the path is a path that communicably connects any initiator port of the first storage system and any target port of the second storage system. The node includes a first VOL that forms a remote copy pair with a second VOL provided in the second storage system. When sending a command for the remote copy in the remote copy pair to the second storage system, the node selects, unless an abnormality related to the initiator port of the node is detected, the path connected to the initiator port, and sends the command via the selected path.

14 Claims, 15 Drawing Sheets

SYSTEM CONFIGURATION MANAGEMENT TABLE

810

NODE CONFIGURATION MANAGEMENT TABLE

| NODE ID | STATE | CPU USAGE RATE % | MEMORY USAGE RATE % | DRIVE ID LIST | PORT ID LIST |
|---------|-------|------------------|---------------------|---------------|--------------|
| 0 | Warning | 40 | 40 | 0, 1, 2 | 0, 1 |
| 1 | Normal | 10 | 20 | 3, 4 | 2, 3 |
| 2 | Normal | 10 | 20 | 5, 6 | 4, 5 |
| ... | ... | ... | ... | ... | ... |

811    812    815    816    813    814

820

DRIVE CONFIGURATION MANAGEMENT TABLE

| DRIVE ID | STATE | BE BANDWIDTH USAGE RATE % | DRIVE USAGE RATE % | SIZE |
|----------|-------|---------------------------|--------------------|------|
| 0 | Normal | 80 | 30 | 1400 GB |
| 1 | Normal | 40 | 30 | 1400 GB |
| 2 | Failure | - | 20 | 2000 GB |
| ... | ... | ... | ... | ... |

821    822    824    825    823

830

PORT CONFIGURATION MANAGEMENT TABLE

| PORT ID | STATE | NW BANDWIDTH USAGE RATE % | Address |
|---------|-------|---------------------------|---------|
| 0 | Normal | 80 | 10.12.00.201 |
| 1 | Normal | 10 | 10.12.00.202 |
| 2 | Normal | 10 | 10.12.00.203 |
| ... | ... | ... | ... |

PAIR CONFIGURATION MANAGEMENT TABLE

910

VOL MANAGEMENT TABLE

| VOL ID | OWNER NODE ID | STANDBY NODE ID | SIZE | ATTRIBUTE |
|--------|---------------|-----------------|------|-----------|
| 0 | 1 | 2 | 500 GB | NML_VOL |
| 1 | 2 | 3 | 1200 GB | PVOL |
| 2 | 2 | 3 | 2400 GB | PJVOL |
| ... | ... | ... | ... | ... |

911     912     913     914     915

920

PAIR MANAGEMENT TABLE

| PAIR GROUP ID | PJVOL ID | PVOL ID | SJVOL ID | SVOL ID | PG-ID | STATE |
|---------------|----------|---------|----------|---------|-------|-------|
| 1 | 1 | 1 | 1 | 1 | 1 | PAIR |
| 2 | 3 | 5, 6 | 5 | 7, 8 | 2, 4 | COPY |
| 3 | - | 7 | - | 9 | 3 | SUSPEND |
| ... | ... | ... | ... | ... | ... | ... |

921    922    923    924    925    927    926

930

JNL MANAGEMENT TABLE

| PAIR GROUP ID | JNL ID | P/S VOL ID | P/SVOL ADDRESS | SIZE | CACHE SEGMENT ID |
|---------------|--------|------------|----------------|------|------------------|
| 1 | 0 | 1,1 | ... | 256KB | 8 |
| 2 | 0 | 5,7 | ... | 8KB | 9 |
| 2 | 1 | 6,8 | ... | 32KB | 7 |
| ... | ... | ... | ... | ... | ... |

| PATH MANAGEMENT TABLE | | | | | | |
|---|---|---|---|---|---|---|
| PG-ID | P-ID | PROTOCOL INFORMATION | STATE | AVERAGE RESPONSE ms | Local Address | Destination Address |
| 1 | 11 | iSCSI | Normal | 50 | 10.12.00.201 (Node 1) | 172.16.00.101 |
| | 12 | iSCSI | Normal | 65 | 10.12.00.202 (Node 2) | 172.16.00.102 |
| | 13 | iSCSI | Normal | 70 | 10.12.00.203 (Node 3) | 172.16.00.102 |
| | 14 | iSCSI | Normal | 60 | 10.12.00.201 (Node 1) | 172.16.00.102 |
| 2 | 21 | iSCSI | Normal | ⋯ | 10.12.00.202 (Node 2) | 172.16.00.102 |
| | 22 | iSCSI | Failure | ⋯ | ⋯ | ⋯ |
| 3 | 31 | iSCSI | Failure | ⋯ | 10.12.00.203 (Node 3) | 172.16.00.103 |
| ⋯ | ⋯ | ⋯ | ⋯ | ⋯ | ⋯ | ⋯ |

Figure 13:
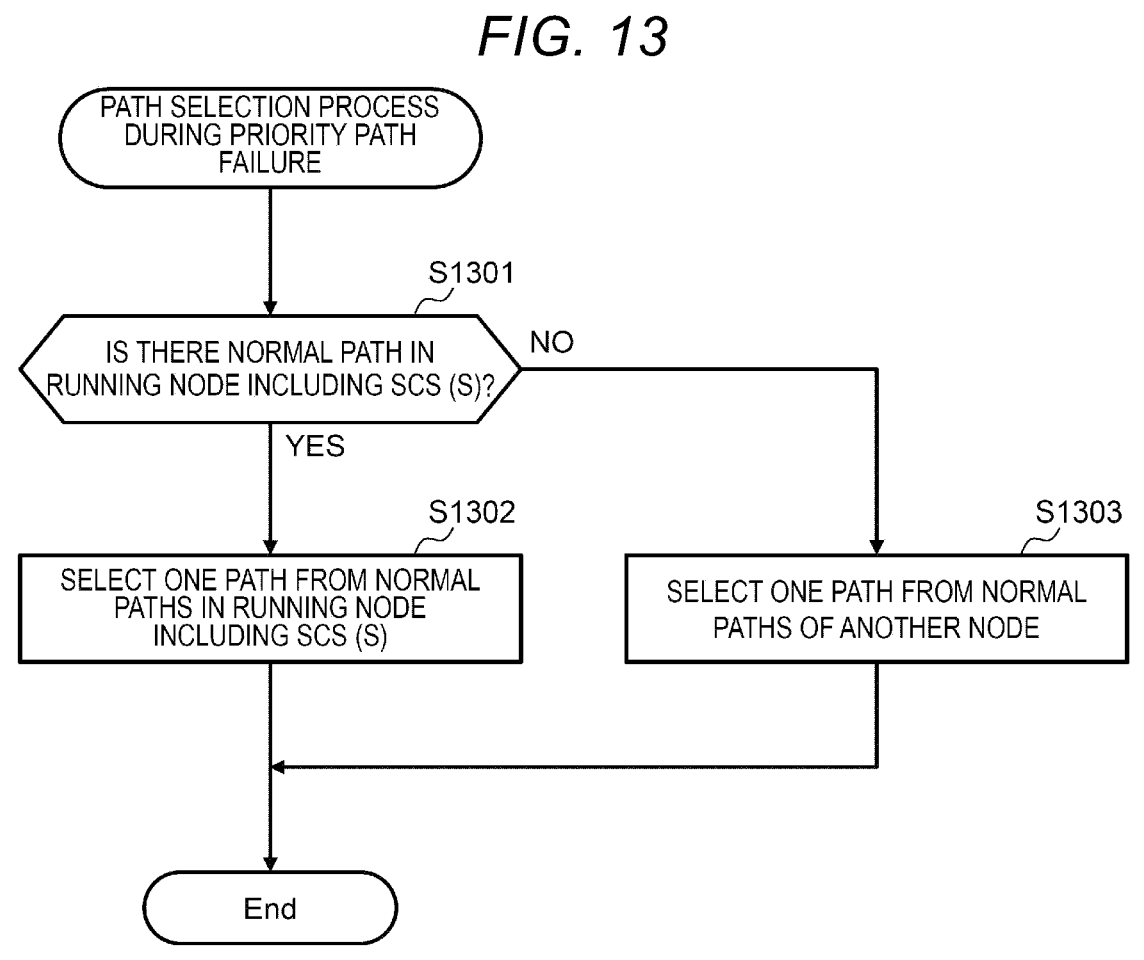

```
        ┌─────────────────────────┐
        │  PATH SELECTION PROCESS  │
        │  DURING PRIORITY PATH    │
        │         FAILURE          │
        └─────────────────────────┘
                     │
                     ▼                    S1301
        ╱─────────────────────────╲  NO
       ╱   IS THERE NORMAL PATH IN  ╲─────────────────┐
       ╲ RUNNING NODE INCLUDING SCS (S)? ╱            │
        ╲─────────────────────────╱                   │
                     │ YES                             │
                     ▼           S1302                 ▼           S1303
        ┌─────────────────────────┐     ┌─────────────────────────┐
        │ SELECT ONE PATH FROM NORMAL │  │ SELECT ONE PATH FROM NORMAL │
        │   PATHS IN RUNNING NODE     │  │   PATHS OF ANOTHER NODE     │
        │     INCLUDING SCS (S)       │  │                             │
        └─────────────────────────┘     └─────────────────────────┘
                     │                               │
                     │◄──────────────────────────────┘
                     ▼
              ┌─────────────┐
              │     End     │
              └─────────────┘
```

STORAGE SYSTEM FOR REMOTE COPY AND PATH SELECTION METHOD FOR REMOTE COPY

BACKGROUND OF THE INVENTION

1. Field of the Invention

The present invention generally relates to remote copy between storage systems.

2. Description of Related Art

For example, Patent Literature 1 discloses a technology related to remote copy.

CITATION LIST

Patent Literature

Patent Literature 1: WO2016/194096

SUMMARY OF THE INVENTION

In remote copy from a PVOL (a primary VOL) in a primary storage system (a storage system in a primary site) to an SVOL (a secondary VOL) in a secondary storage system (a storage system in a secondary site), data passes through a path selected from among a plurality of paths between the PVOL and the SVOL. The remote copy includes push-type remote copy (remote copy performed in response to a write from the primary storage system to the secondary storage system) and pull-type remote copy (remote copy performed in response to a read from the secondary storage system to the primary storage system), and in the push-type remote copy, the primary storage system can select the path, and in the pull-type remote copy, the secondary storage system can select the path. Hereinafter, a storage system that selects a path is referred to as a "first storage system", and a storage system that communicates with the first storage system for remote copy is referred to as a "second storage system".

The path may be selected in a round-robin manner. Since each path is equally selected, load distribution is expected, and/or when a failure in a port occurs, it is expected to detect the failure of the port at an early stage.

As the first storage system, a storage system including a plurality of storage nodes based on software defined storage (SDS) may be adopted. These storage nodes are in, for example, an on-premises environment or a cloud environment. The storage node (hereinafter, referred to as a node) is, for example, a general-purpose computer and has a VOL (logical volume).

A certain node in the first storage system selects a path in a round-robin manner, and as a result, depending on the selected path, data transfer between the certain node and another node is required in the remote copy. Therefore, performance of the remote copy may decrease.

Such a problem may exist regardless of whether the first storage system is a secondary storage system or a primary storage system. Further, such a problem may exist regardless of whether the remote copy is synchronous remote copy (remote copy to which a completion response to a write request is returned when data written to the PVOL accompanying the write request is written to the SVOL) or asynchronous remote copy (remote copy to which a completion response to the write request is returned even when data written to the PVOL accompanying the write request is not written to the SVOL).

There are a plurality of paths between the first and second storage systems. For each of the plurality of paths, the path is a path that communicably connects any initiator port among a plurality of initiator ports provided in the plurality of nodes forming the first storage system and any target port among one or a plurality of target ports provided in the second storage system. For one node or each of two or more nodes of the plurality of nodes, the node includes a first VOL that forms a remote copy pair with a second VOL of one or a plurality of VOLs provided in the second storage system. When any node sends a command for remote copy in the remote copy pair to the second storage system, the node selects, unless an abnormality related to the initiator port of the node is detected, the path connected to the initiator port, and sends the command via the selected path.

According to the invention, it is possible to reduce a performance decrease in remote copy performed between a second storage system and a first storage system including a plurality of nodes.

BRIEF DESCRIPTION OF THE DRAWINGS

FIG. 8 is a diagram showing an example of a system configuration management table;

FIG. 9 is a diagram showing an example of a pair configuration management table;

FIG. 10 is a diagram showing an example of a path management table;

FIG. 13 is a diagram showing a flow of the path selection process during a priority path failure;

DESCRIPTION OF THE INVENTION

Figure 1:
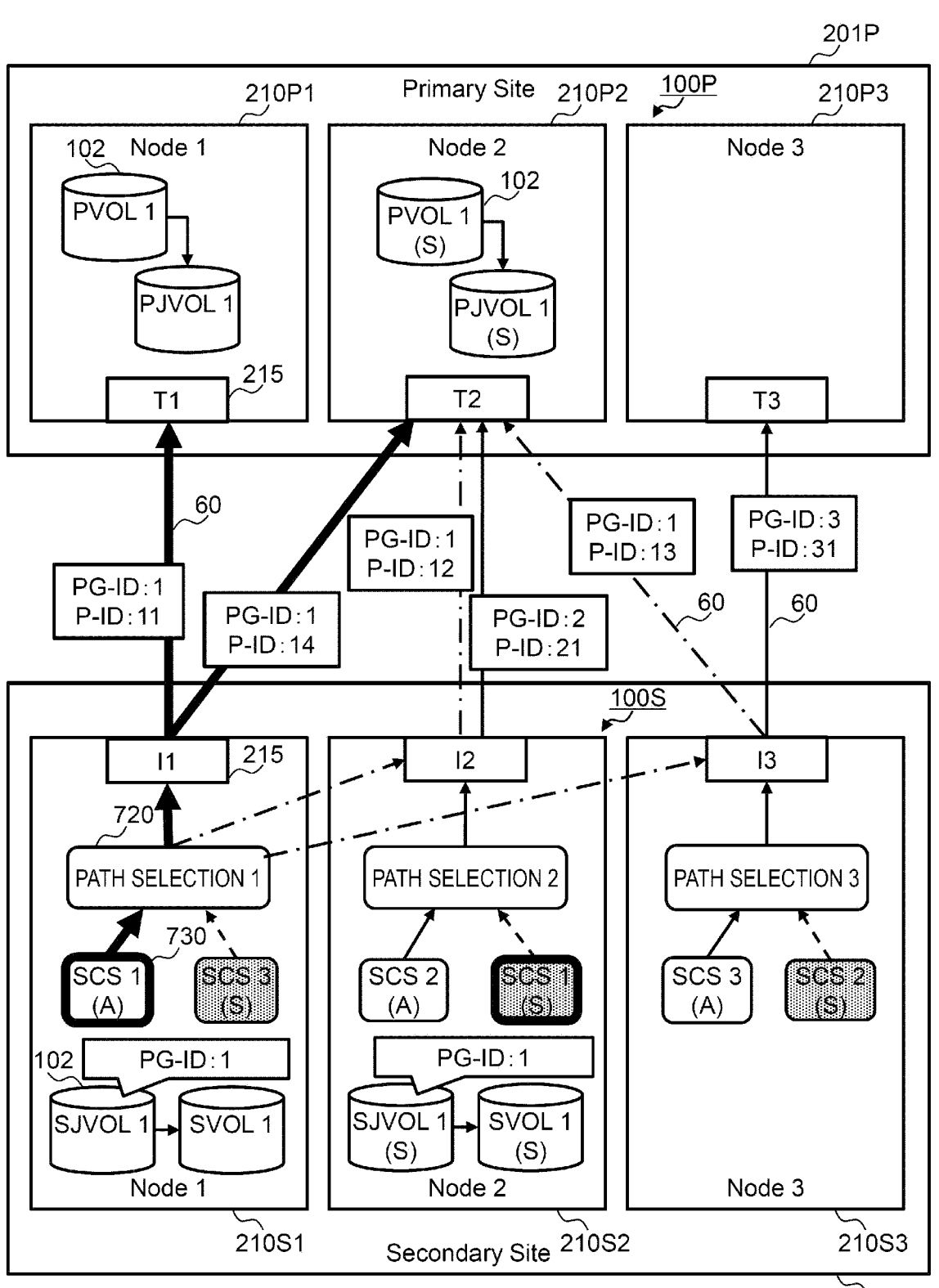
FIG. 1 is a schematic diagram showing an outline of a first embodiment according to the invention.

In the following description, an "interface device" may be one or more communication interface devices. The one or more communication interface devices may be one or more communication interface devices of the same type (for example, one or more network interface cards (NICs)) or two or more communication interface devices of different types (for example, NIC and host bus adapter (HBA)).

In the following description, a "memory" is one or more memory devices, which are examples of one or more storage devices, and may be typically a main storage device. At least one memory device in the memory may be a volatile memory device or a non-volatile memory device.

In the following description, a "persistent storage device" may be one or more persistent storage devices, which are examples of one or more storage devices. The persistent storage device may be typically a non-volatile storage device (for example, an auxiliary storage device), and specifically, for example, a hard disk drive (HDD), a solid state drive (SSD), or a non-volatile memory express (NVMe) drive.

In the following description, a "processor" may be one or more processor devices. At least one processor device may be typically a microprocessor device such as a central processing unit (CPU), and may be another type of processor device such as a graphic processing unit (GPU). At least one processor device may be a single core or a multi-core. At least one processor device may be a processor core. At least one processor device may be a processor device in the broad sense, such as a hardware circuit (for example, a field-programmable gate array (FPGA), a complex programmable logic device (CPLD), or an application specific integrated circuit (ASIC)) that performs a part or all the process.

In the following description, although the information that can be output in response to an input may be described by an expression such as "xxx table", the information may be data of any structure (for example, it may be structured data or unstructured data), and may be a learning model such as a neural network, a genetic algorithm, or a random forest that generates an output in response to an input. Therefore, the "xxx table" can be referred to as "xxx information". In the following description, a configuration of each table is an example. One table may be divided into two or more tables, or all or some of two or more tables may be one table.

In the following description, a process may be described using a "program" as a subject, but since a program is executed by a processor to perform a predetermined process using a storage device and/or an interface device as appropriate, the subject of the process may be a processor (or a device such as a controller including the processor). The program may be installed on a device such as a computer from a program source. The program source may be, for example, a program distribution server or a computer-readable (for example, non-transitory) recording medium. In addition, in the following description, two or more programs may be implemented as one program, or one program may be implemented as two or more programs.

In addition, in the following description, when elements of the same type are described without being distinguished, a common part of the reference numerals may be used, and when elements of the same type are distinguished and described, the reference numerals or identifiers of the elements may be used. For example, with respect to the PVOL, there is a case in which the PVOL is distinguished from another PVOL by using an identifier such as a "PVOL 1".

Hereinafter, several embodiments will be described.

First Embodiment

FIG. 1 is a schematic diagram showing an outline of a first embodiment according to the invention.

There is a primary storage system 100P in a primary site 201P. The primary storage system 100P may be a so-called disk array system, and in the embodiment, is a system including a plurality of primary nodes 210P.

There is a secondary storage system 100S in a secondary site 201S. The secondary storage system 100S is a system including a plurality of secondary nodes 210S.

A node 210 is typically a general-purpose computer, and may be a device other than the general-purpose computer. The node 210 includes a port 215, a VOL (logical volume) 102, and storage control software (SCS) 730. The VOL 102 is based on a persistent storage device inside or outside the node 210.

The plurality of primary nodes 210P include, for example, primary nodes 210P1 to 210P3. The VOLs 102 in the primary storage system 100P include a PJVOL 1, a PJVOL 1 (S), a PVOL 1, and a PVOL 1 (S). The "PJVOL" is a JVOL located on the primary site 201P. The "JVOL" is a VOL in which a JNL (journal) is stored. The "JNL" includes data to be copied and metadata thereof. The metadata in the JNL includes a sequence number (SEQ #) which is a value for identifying an order in which the data to be copied is written, and a write destination address of the data. The "PJVOL 1 (S)" corresponds to a standby PJVOL 1 in which redundant data (for example, a replicated JNL) of the JNL stored in the PJVOL 1 is stored. The "PVOL" is a primary VOL. The "PVOL 1 (S)" corresponds to a standby PVOL 1 in which redundant data (for example, replicated data) of data stored in the PVOL 1 is stored.

Each of the plurality of primary nodes 210P has a target port as the port 215. "Tm" (m is a natural number) means a target port m. The primary node 210P includes one or a plurality of ports 215.

The plurality of secondary nodes 210S include, for example, secondary nodes 210S1 to 210S3. The VOL 102 includes an SJVOL 1, an SJVOL 1 (S), an SVOL 1, and an SVOL 1 (S). The "SJVOL" is a JVOL located on the secondary site 201S. The "SJVOL 1 (S)" corresponds to a standby SJVOL 1 in which redundant data (for example, a replicated JNL) of the JNL stored in the SJVOL 1 is stored. The "SVOL" is a secondary VOL forming a pair with the PVOL. The "SVOL 1 (S)" corresponds to a standby SVOL 1 in which redundant data (for example, replicated data) of data stored in the SVOL 1 is stored.

Each of the plurality of secondary nodes 210S has an initiator port as the port 215. "In" (n is a natural number) means an initiator port n. The secondary node 210S includes one or a plurality of ports 215.

There are a plurality of paths 60 between the primary storage system 100P and the secondary storage system 100S. For each of the plurality of paths 60, the path 60 is a path that communicably connects any initiator port and any target port. In FIG. 1, "P-ID" is a path ID. The "path" is a communication path of data and commands. For example, in the case of an iSCSI protocol, the path may be an iSCSI session.

There are a plurality of path groups. The path group includes two or more (or one) paths 60 and is associated with a remote copy pair. In FIG. 1, "PG-ID" is a path group ID. In the embodiment, two or more paths 60 having different path groups may be connected between the same initiator port and the same target port. Examples of "two or more paths 60 having different path groups" include a path (PG-ID: 1, P-ID:7) and a path (PG-ID: 2, P-ID: 21). These paths are each a path that connects I2 and T2. In other words, if the path groups are different, the paths connected between the same initiator port and the same target port may be treated as separate paths. Hereinafter, a path group of "PG-ID: p" may be referred to as a "path group p", and the path 60 of a "P-ID: q" may be referred to as a "path q".

For each of the two or more nodes 210, a processor of the node 210 executes the storage control software (SCS) 730 for controlling an input/output (I/O) with respect to the VOL 102. Although the SCS of the primary node 210P is not shown in FIG. 1 due to space limitations, the SCS 730 is also present in the primary node 210P as in the secondary node 210S.

Each of the primary storage system 100P and the secondary storage system 100S has a plurality of (or one) SCS groups. For each of the plurality of SCS groups, the SCS group includes one SCS (A), which is an active SCS 730, and one or a plurality of SCSs (S), which is a standby SCS 730. The one SCS (A) and the one or the plurality of SCSs (S) in the SCS group are arranged in two or more different nodes 210. When a failure occurs in the node 210 having the SCS (A), a fail-over is performed so that any of the SCSs (S) belonging to the same SCS group becomes the SCS (A) in place of the SCS (A). For example, in the secondary storage system 100S, an SCS x (A) (x is a natural number) and an SCS x (S) form an SCS group x, and when a failure occurs in the node 210 having the SCS x (A), the fail-over is performed from the SCS x (A) in the node 210 to any SCS x (S) in another node 210.

In the embodiment, the JNL is used, and the port 215 of the secondary storage system 100S is the initiator port. That is, the remote copy performed in the embodiment is pull-type asynchronous remote copy. The remote copy is performed for each remote copy pair (VOL pair). A PVOL y (y is a natural number) and an SVOL y form a remote copy pair y. According to the example shown in FIG. 1, the PVOL 1 and the SVOL 1 form a remote copy pair 1.

Because of the pull-type asynchronous remote copy, an RDJNL command (a JNL read command) is sent from the secondary storage system 100S for remote copy in the remote copy pair. In the RDJNL command, for example, SEQ #of the latest JNL among unreceived JNLs is designated, the JNL is received from the primary storage system 100P in response to the RDJNL command, the received JNL is stored in the SJVOL 1, and the JNL stored in the SJVOL 1 is reflected in the SVOL 1 (data in the JNL is written to the SVOL 1).

Since the secondary storage system 100S is implemented to send the RDJNL command, in the embodiment, the secondary storage system 100S executes a path selection program 720, and the path selection program 720 selects the path 60 used for sending the RDJNL command. The path selection program 720 is provided in each secondary node 210S. The path selection program 720 in a secondary node 210Sz (z is a natural number) may be referred to as a "path selection program z".

When sending the RDJNL command for the remote copy in the remote copy pair to the primary storage system 100P, the secondary node 210S selects, unless an abnormality related to the initiator port is detected, the path 60 connected to the initiator port of the secondary node 210S, and sends the RDJNL command via the selected path 60. Specifically, for example, the secondary node 210S that selects the path 60 is the node 210S having the SCS (A) that sends the RDJNL command. When an SCS 1 (A) of the secondary node 210S1 sends the command for the remote copy in the remote copy pair 1 to the primary storage system 100P, a path selection program 1 selects a path 11 connected to an initiator port I1 from a path group 1 associated with the remote copy pair 1, and the SCS 1 (A) sends the RDJNL command via the selected path 11 unless an abnormality related to the initiator port I1 of the secondary node 210S1 is detected.

Hereinafter, the embodiment will be described in detail.

Figure 2:
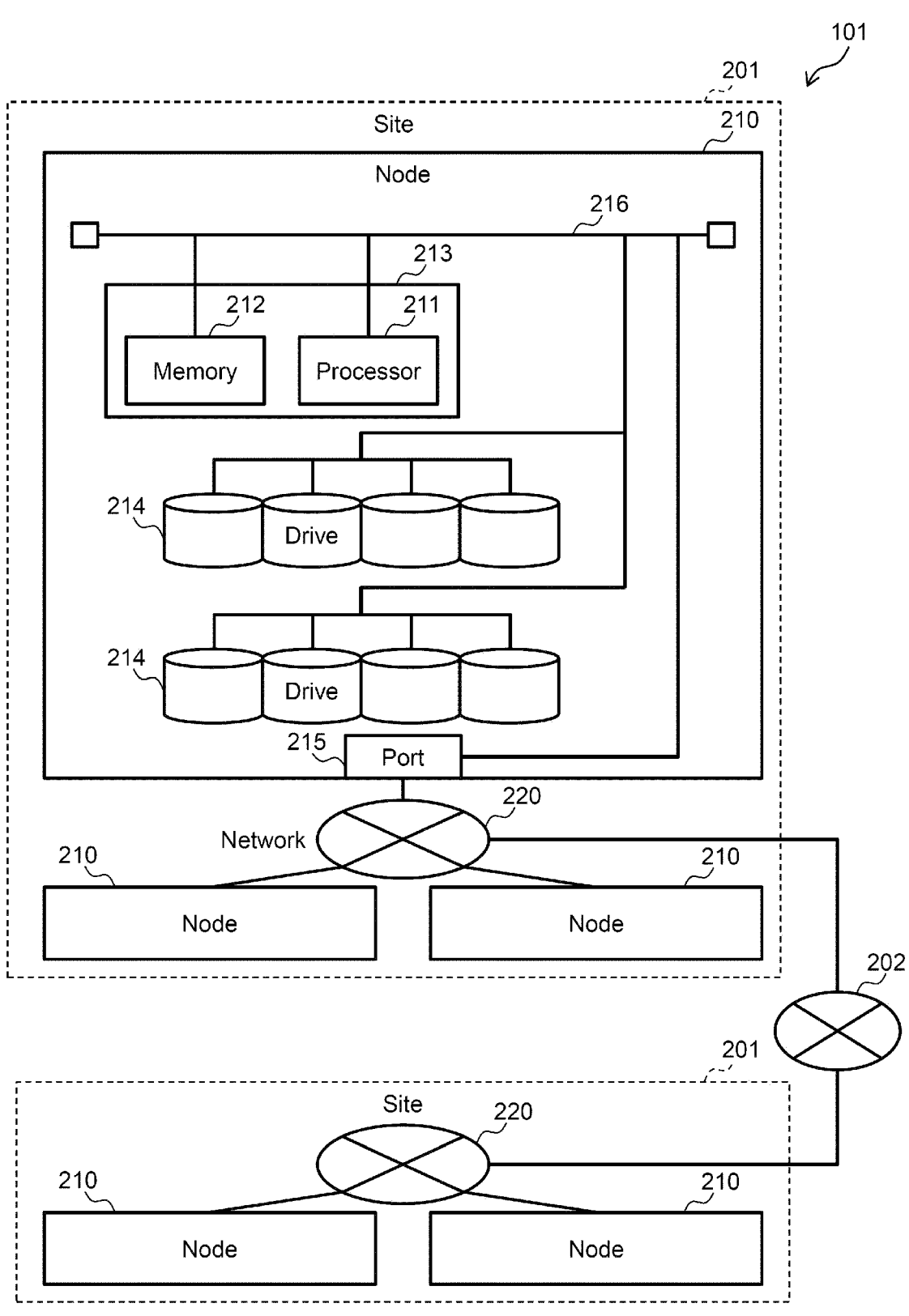
FIG. 2 is a diagram showing a physical configuration example of an entire system.

FIG. 2 is a diagram showing a physical configuration example of a storage system 101.

There are a plurality of sites 201. The sites 201 are communicably connected via a network 202. The network 202 is, for example, a wide area network (WAN), and is not limited to the WAN. The site 201 is a data center or the like, and includes a plurality of (or one) nodes 210.

The node 210 may be a general-purpose computer. The node 210 includes, for example, one or more processor packages 213 including a processor 211 and a memory 212, one or more drives 214, and one or more ports 215. These components are connected via an internal bus 216. The drive 214 is an example of a persistent storage device.

The processor 211 is, for example, a central processing unit (CPU) and performs various processes.

The memory 212 is typically a volatile memory, and stores control information or data necessary for implementing functions of the node 210. The memory 212 stores, for example, a program executed by the processor 211. The drive 214 stores various kinds of data and programs.

The port 215 is connected to a network 220 in the site 201, and connects a present node to another node 210 in the site 201 via the network 220 so that the present node can communicate with the other node 210. The network 220 is, for example, a local area network (LAN), and is not limited to the LAN.

The physical configuration of the system is not limited to the above-described configuration. For example, the networks 202 and/or 220 may be made redundant. For example, the network 220 may be separated into a management network and a storage network, a connection standard may be Ethernet (registered trademark), Infiniband, or wireless, and a connection topology is not limited to the configuration shown in FIG. 2. For example, the drive 214 may be independent of the node 210.

Figure 3:
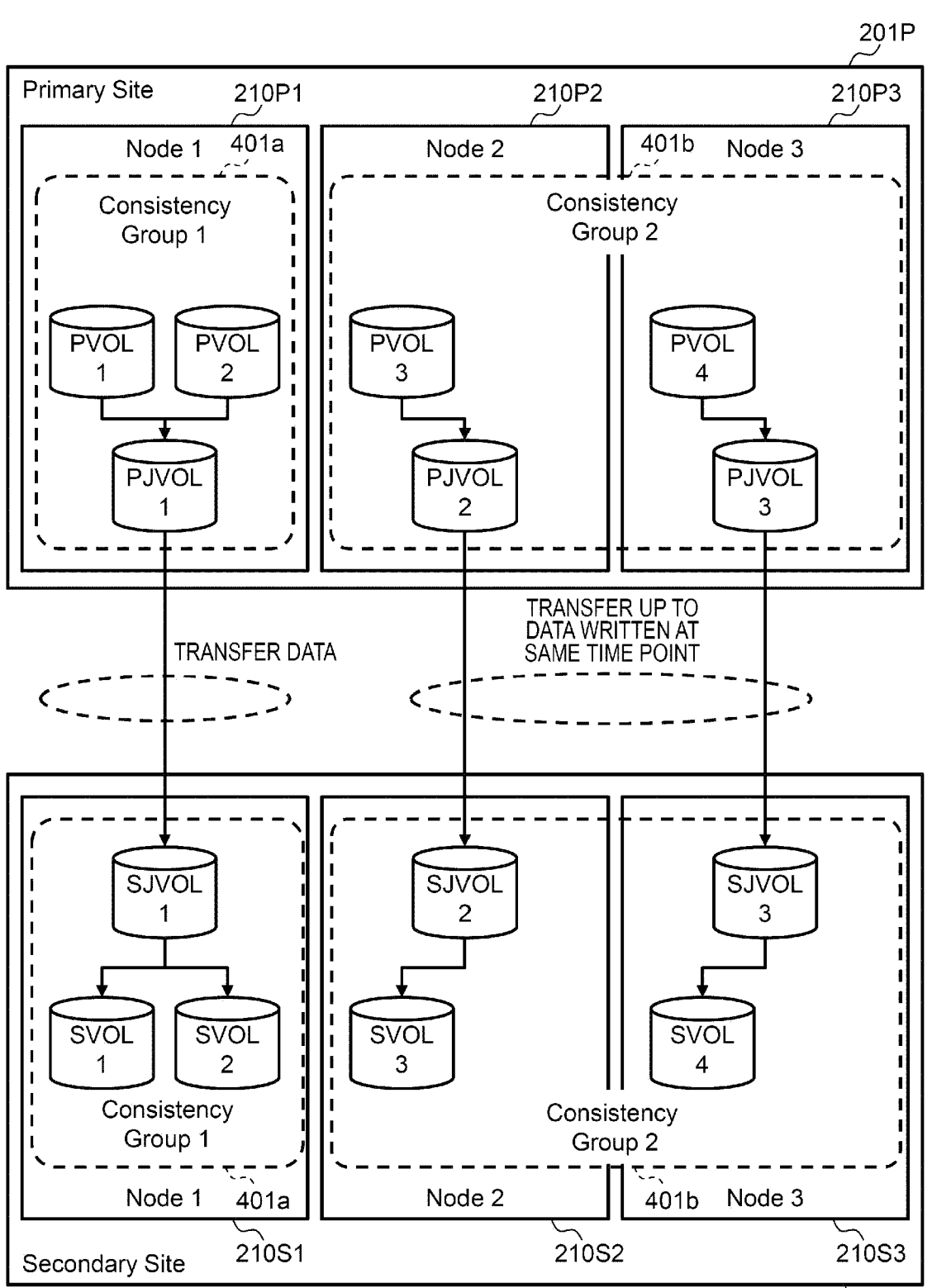
FIG. 3 is a schematic diagram showing an outline of a remote copy configuration.

FIG. 3 is a schematic diagram showing an outline of a remote copy configuration.

A plurality of remote copy pairs are constructed between the primary site 201P and the secondary site 201S. Specifically, for example, two consistency groups 401a and 401b are constructed between the primary site 201P and the secondary site 201S. The consistency group 401 is made up of VOLs 102 of a plurality of (or one) remote copy pairs, and in the consistency group 401, the plurality of PVOLs are copied to the SVOLs while maintaining consistency. More specifically, for example, in the consistency group 401, update differential data for the plurality of PVOLs 102 up to the same time point is copied to the plurality of SVOLs. Control (consistency control) of the consistency group 401 is managed by the PJVOL. The update differential data for the plurality of (or one) PVOLs is stored in the PJVOL together with the metadata such as a write time point. When transferring PVOL data to the secondary site 201S, the primary site 201P transfers, to the secondary site 201S, the update differential data up to the same time point among the update differential data written to the PJVOL. Accordingly, it is possible to copy data to the SVOL in a state in which the consistency in update time points among the plurality of PVOLs is maintained.

For example, according to the consistency group 401a, data is copied to the SVOL 1 and the SVOL 2 in the secondary node 210S1 via the PJVOL 1 and the SJVOL 1 in a state in which the consistency of the PVOL 1 and the PVOL 2 in the primary node 210P1 is maintained. According to the consistency group 401b, data is copied to an SVOL 3 in a secondary node 210S2 and an SVOL 4 in a secondary node 210S3 via a PJVOL 2 in the primary node 210P2, a PJVOL 3 in the primary node 210P3, an SJVOL 2 in the secondary node 210S2, and an SJVOL 3 in the secondary node 210S3, in a state in which the consistency of a PVOL 3 in the primary node 210P2 and a PVOL 4 in the primary node 210P3 is maintained. The PJVOL and the SJVOL do not necessarily have a 1:1 correspondence (for example, 1:many, many:1, or many:many), and the PJVOL may be an area on the memory 212.

As can be understood from the specific configuration described above, the consistency group 401 may be made up of the VOLs 102 in the specific node 210 in the site 201, or may be made up of the VOLs 102 in the plurality of nodes 210 in the site 201.

Figure 4:
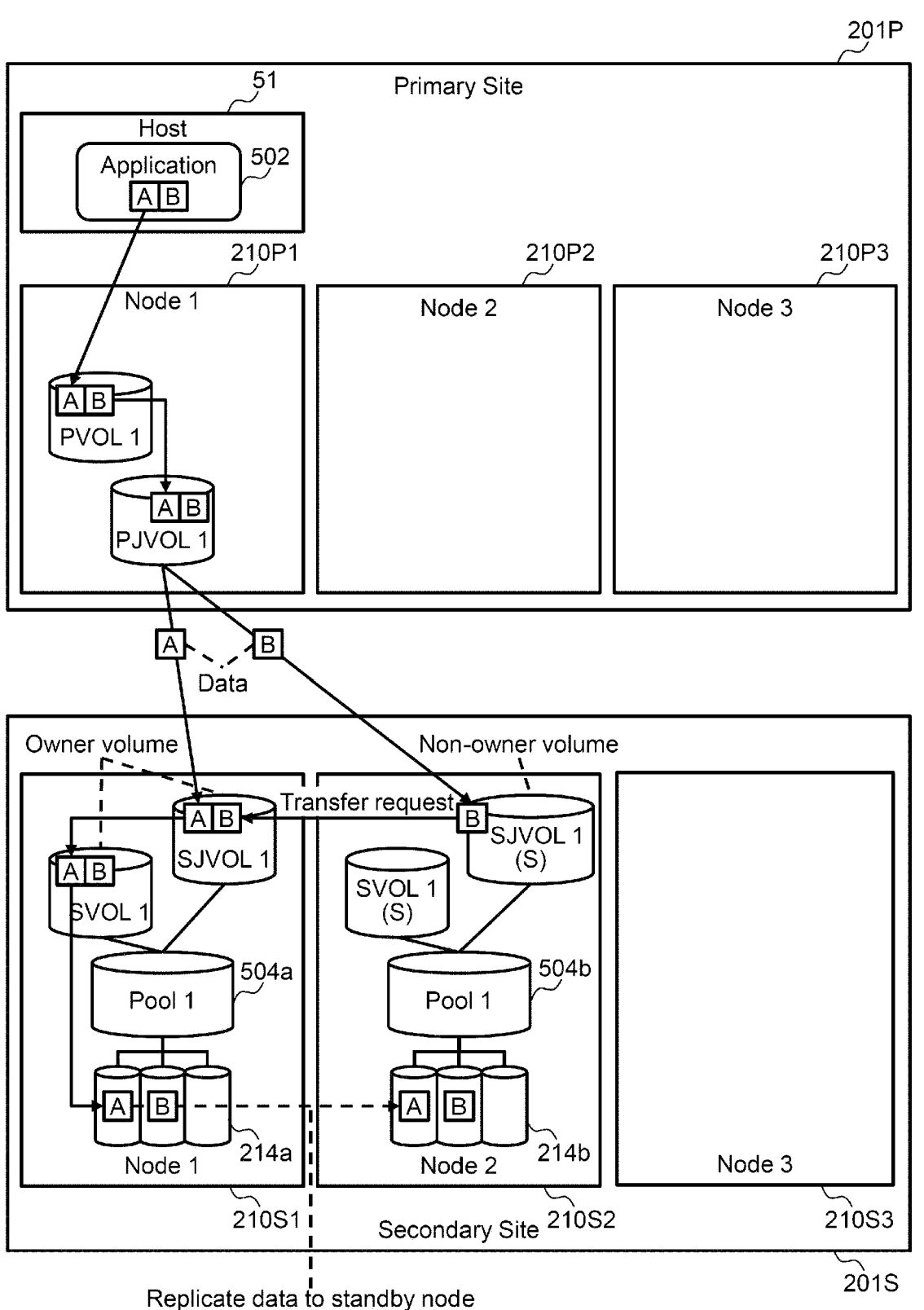
FIG. 4 is a schematic diagram showing an outline of an I/O request process.

FIG. 4 is a schematic diagram showing an outline of an I/O request process.

First, an application 502 running on a host 51 issues a write request designating the PVOL 1 to the primary node 210P1. The primary node 210P1 that receives the write request writes data A and B associated with the write request to the PVOL 1, and further writes a JNL including the data A and B as the update differential data to the PJVOL 1.

Next, the primary node 210P1 transfers the JNL (the update differential data) written to the PJVOL 1 to the SJVOL 1 and the SJVOL 1 (S) of the secondary site 201S. At this time, when a plurality of paths are established between the primary site 201P and the secondary site 201S, the JNL may be transferred using any path. Normally, the primary node 210P1 transfers the JNL to the secondary node 210S1 that has ownership of the SVOL 1 paired with the PVOL 1. However, when a failure occurs in the path for which the node has the ownership, the primary node 210P1 may transfer the JNL to the secondary node 210S2 or the like that does not have the ownership. For example, when the primary node 210P1 transfers the JNL to the secondary node 210S2 that does not have the ownership, the secondary node 210S2 transfers the received JNL to the secondary node 210S1 that has the ownership, and the secondary node 210S1 writes the JNL to the SJVOL 1.

Next, the secondary node 210S1 writes the data A and B in the JNL written to the SJVOL 1 to the SVOL 1. The data A and B written to the SVOL 1 are written to a drive 214a via a storage pool 504a. When a configuration of the drive 214a is a direct attached storage (DAS) in which the node 210 and the drive 214 are connected to each other on a one-to-one basis, the JNL is written to the drive 214a mounted in the secondary node 210S1. By writing all the data to be copied to the SVOL 1 to the drive 214a of the secondary node 210S1 having the ownership of the SVOL 1 in this way, it is not necessary to read data from another node when reading data from the SVOL 1 later. Accordingly, it is possible to eliminate an inter-node transfer process and implement a high-speed read process.

The storage pool 504 may be an area based on one or more drives 214. Storage functions such as thin-provisioning, compression, or deduplication are provided, and a necessary storage function process is performed on data written to the storage pool 504.

The secondary node 210S1 also writes redundant data of data to be written to a drive 214b of the secondary node 210S2 in order to protect the data from a node failure when writing the data to the drive 214a. In writing the redundant data, when a data protection policy is replication, a replica of data is written to the drive 214b as the redundant data. On the other hand, when the data protection policy is erasure coding, parity is calculated from the data, and the calculated parity is written to the drive 214b as the redundant data.

Although not shown, the primary node 210P1 transfers write target data to be written to the PVOL 1 to the primary node 210P2 (redundancy), and the primary node 210P2 receives the data and writes the data to the PVOL 1 (S). The primary node 210P2 writes the JNL to the PJVOL 1 (S). The JNL written in the PJVOL 1 (S) may be a JNL transferred from the primary node 210P1 or a JNL generated based on data written in the PVOL 1 (S). In this way, the PVOL 1 (S) as a replicate of the PVOL 1 and the PJVOL 1 (S) as a replicate of the PJVOL 1 are maintained (see FIG. 1).

Figure 5:
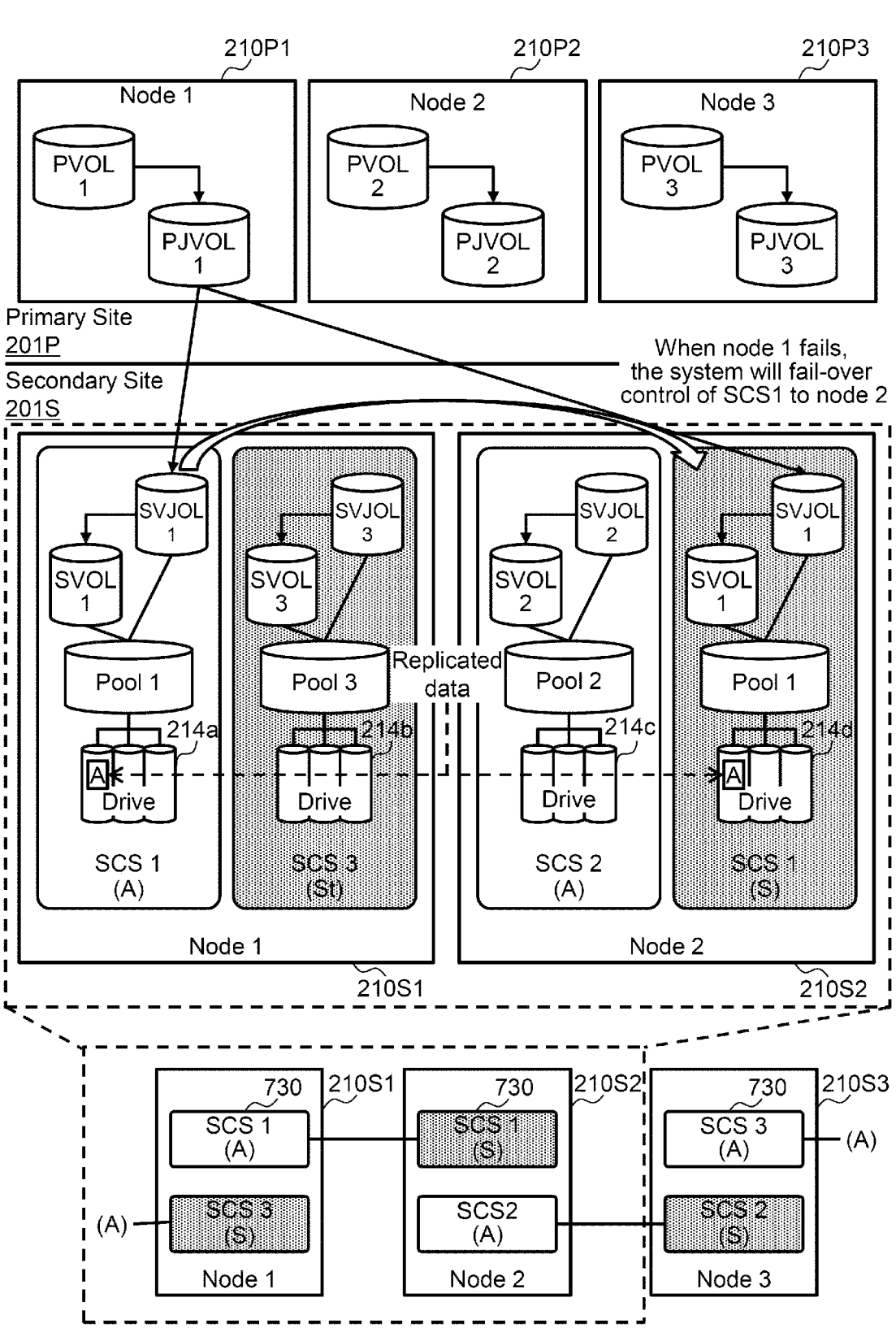
FIG. 5 is a schematic diagram showing an outline of a recovery process from a node failure.

FIG. 5 is a schematic diagram showing an outline of a recovery process from a node failure.

The SCSs 730 are operating in the secondary nodes 210S1, 210S2, and 210S3. The secondary node 210S includes the SCS (A) and the SCS (S) associated with the SCS (A) in another secondary node 210S (the SCS (S) in an SCS group including the SCS (A) in another secondary node 210S). For example, the secondary node 210S1 includes the SCS 1 (A) and an SCS 3 (S), the secondary node 210S2 includes an SCS 2 (A) and an SCS 1 (S), and the secondary node 210S3 includes an SCS 3 (A) and an SCS 2 (S). The SCS x (A) and the SCS x (S) belong to the SCS group x (a redundant group of the SCS x), and the number of SCS x (S) is not limited to one and may be plural.

The recovery process from the node failure will be described using the specific example shown in FIG. 5.

The secondary node 210S2 replicates configuration information of the SVOL 1 and the SJVOL 1 provided in the secondary node 210S1 in order to take over remote copy pair information of the secondary node 210S1. The secondary node 210S2 stores redundant data of the data written to the drive 214a of the secondary node 210S1 in a drive 214d. Further, the secondary node 210S2 establishes a path (a communication path) with the primary node 210P1.

For example, when the secondary node 210S1 stops due to a failure, the secondary node 210S2 that detects the failure of the secondary node 210S1 takes over the process of the SCS 1 (A) of the secondary node 210S1, and the SCS 1 (S) changes to the SCS 1 (A). The secondary node 210S2 communicates with the primary node 210P1 and continues the remote copy process between the PVOL 1 and the SVOL 1. That is, the fail-over is performed from the SCS 1 (A) of the secondary node 210S1 to the SCS 1 (S) of the secondary node 210S2. Accordingly, even when the node failure occurs in any one of the secondary sites 210S, another secondary site 210S can continue the remote copy from the primary site 201P.

As described above, in the embodiment, the path selection program 720 in the secondary node 210S having the SCS (A) that sends the RDJNL command selects a path to be used for sending the RDJNL command. Hereinafter, an example of path selection will be described with reference to FIGS. 1 and 6. For example, for the remote copy pair 1 (the pair of the PVOL 1 and the SVOL 1), at least one path selection among the following (1) to (8) is performed.

(1) When sending the RDJNL command, in order to prevent communication between the secondary nodes 210S, the path selection program 720 in the secondary node 210S having the SCS (A) that sends the RDJNL command selects, unless an abnormality related to the initiator port of the secondary node 210S is detected, a path connected to the initiator port, and sends the RDJNL command via the selected path. That is, the path connected to the initiator port of the secondary node 210S having the SCS (A) that sends the RDJNL command is preferentially selected. Specifically, for example, when the SCS 1 (A) sends the RDJNL command for the remote copy pair 1, the path selection program 1 preferentially selects the path 11 connected to the initiator port I1 of the secondary node 210S1 from the path group 1 associated with the remote copy pair 1.

When an abnormality related to I1 is detected, for example, in cases of a failure of the secondary node 210S1 having I1, a failure of I1, performance of I1 being equal to or less than a threshold value, or performance of the path 11 connected to I1 being equal to or less than a threshold value, a path connected to the initiator port of another secondary node 210S is selected, and the RDJNL command is sent via the path. For example, for the remote copy pair 1, at least one of the following path selection (2) to (5) is performed.

Figure 6:
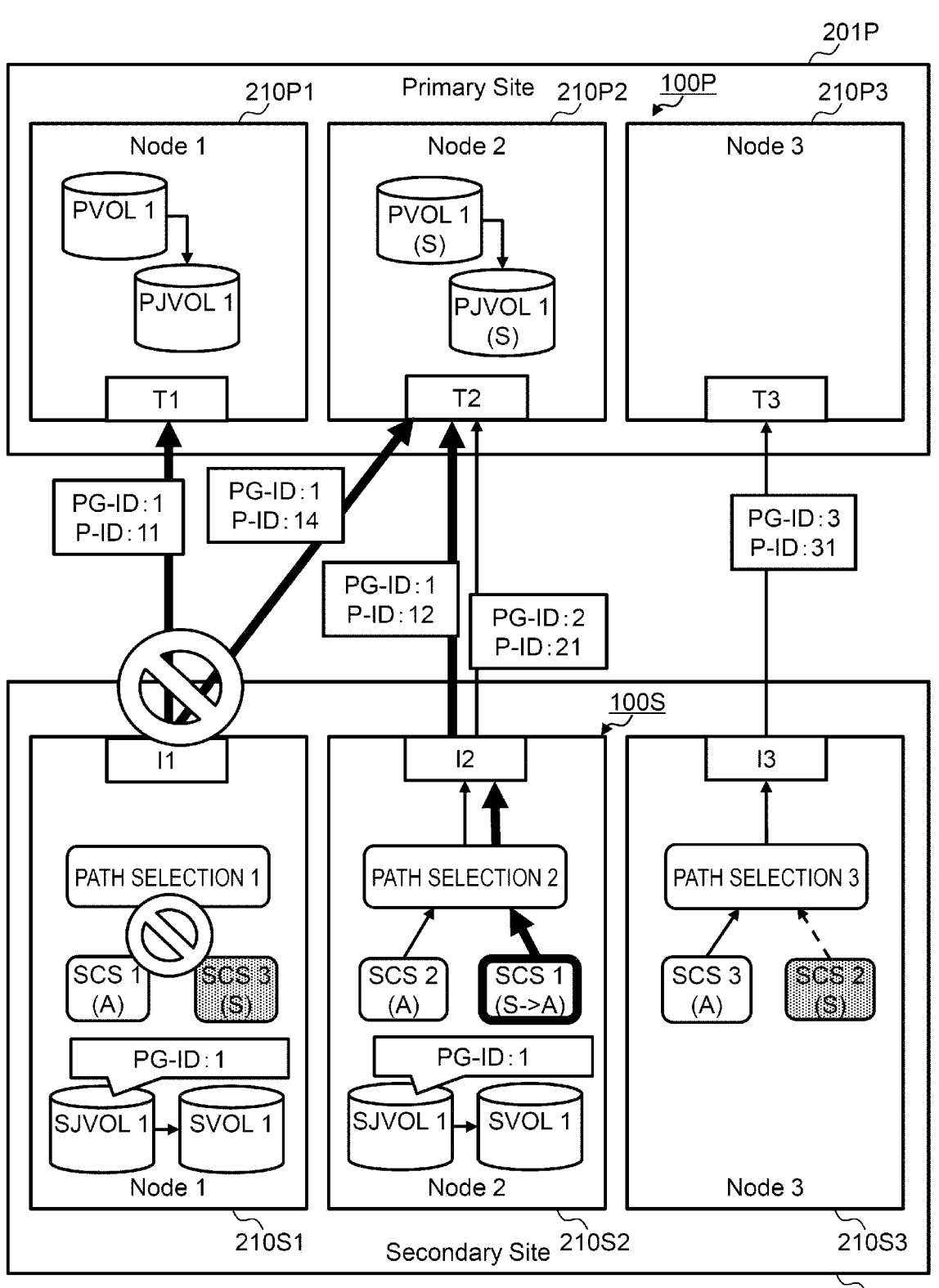
FIG. 6 is a schematic diagram showing an outline of path selection during the node failure.

(2) When a failure occurs in the secondary node 210S1 (see FIG. 6), a path 12 connected to I2 of the secondary node 210S2 in which the SCS 1 (S) (the SCS 1 that becomes active in place of the SCS 1 (A) of the secondary node 210S1) operates is selected from the path group 1 associated with the remote copy pair 1 by a path selection program 2 of the secondary node 210S2 (see thick solid arrows in FIG. 6).

(3) When a port failure occurs in I1, the path 12 connected to I2 of the secondary node 210S2 in which the SCS 1 (S) operates is selected from the path group 1 associated with the remote copy pair 1 by the path selection program 1 of the secondary node 210S1 (see dash-dot arrows in FIG. 1).

(4) In (2) and/or (3), when the port failure occurs in I2, a path 13 connected to I3 of another secondary node 210S3 having no SCS 1 (S) is selected from the path group 1 associated with the remote copy pair 1 by the path selection program 1 or the path selection program 2.

(5) When performance related to I1 is exhausted, the path connected to the initiator port of another secondary node 210S in the path group 1 is selected by the path selection program 1 of the secondary node 210S1 (see the dot-dash line arrows in FIG. 1). "When the performance of I1 is exhausted" is, for example, a case in which the performance of I2 is equal to or less than the threshold value, or a case in which the performance of the path 11 connected to I1 is equal to or less than the threshold value. In addition, "another secondary node 210S" referred to in the paragraph may be the secondary node 210S whose resource usage rate is equal to or less than a threshold value.

(6) In at least one of (1) to (5), when the initiator port of the secondary node 210S does not have the selected path, the path selection program 720 of the secondary node 210S having the initiator port dynamically generates a path connected to the initiator port and selects the generated path. For example, if there is no path connected to I1, the path selection program 1 dynamically generates a path connected to I1. For example, if there is no path connected to I2, the path selection program 1 or the path selection program 2 dynamically generates a path connected to I2. The dynamically generated path may be deleted from the path selection program 720 that generates the path when the abnormality related to the initiator port that causes the generation of the path is resolved. That is, the dynamically generated path may temporarily (or permanently) belong to the path group 1 (it may be managed as a temporary (or permanent) path usable for the remote copy for the remote copy pair 1).

(7) When a plurality of paths in the path group 1 are connected to I1, the path selection program 1 selects a path from the plurality of paths in a round-robin manner. For example, for the remote copy pair 1, the path 11 may be selected when sending a certain RDJNL command, and a path 14 may be selected when sending the next RDJNL command. In response to the RDJNL command via the path 14, the primary node 210P2 may send the JNL from the PJVOL 1 (S) to the secondary node 210S1 via the path 14 (see FIG. 1).

(8) When the plurality of paths in the path group 1 are connected to I1, the path selection program 1 identifies a statistically best path among the plurality of paths (for example, a path having the best performance or the least number of errors) based on statistics (for example, statistics on performance and the number of errors) for each of the plurality of paths, and selects the identified path.

The above path selection utilizes the arrangement of the SCS (A) and the SCS (S) in the secondary storage system 100S. Specifically, for example, according to at least one of (2) to (5), the initiator port of the secondary node 210S other than the secondary node 210S1 is preferentially used for sending the RDJNL command of the SCS (A) arranged in the secondary node 210S for the remote copy pair other than the remote copy pair 1, and therefore, when the abnormality related to the initiator port occurs, the abnormality is detected by the secondary node 210S. In other words, when the abnormality related to the initiator port is not detected by the secondary node 210S, the path connected to the initiator port is usable. That is, in sending the RDJNL command of the SCS 1 (A), even when there is no selection of a path via another secondary node 210S in a round-robin manner, it is possible to know whether the path via the other secondary node 210S is usable before the path selection. As described above, in the embodiment, it is possible to perform the path selection by effectively utilizing the arrangement of the SCS (A) and the SCS (S) in the secondary storage system 100S.

Figure 7:
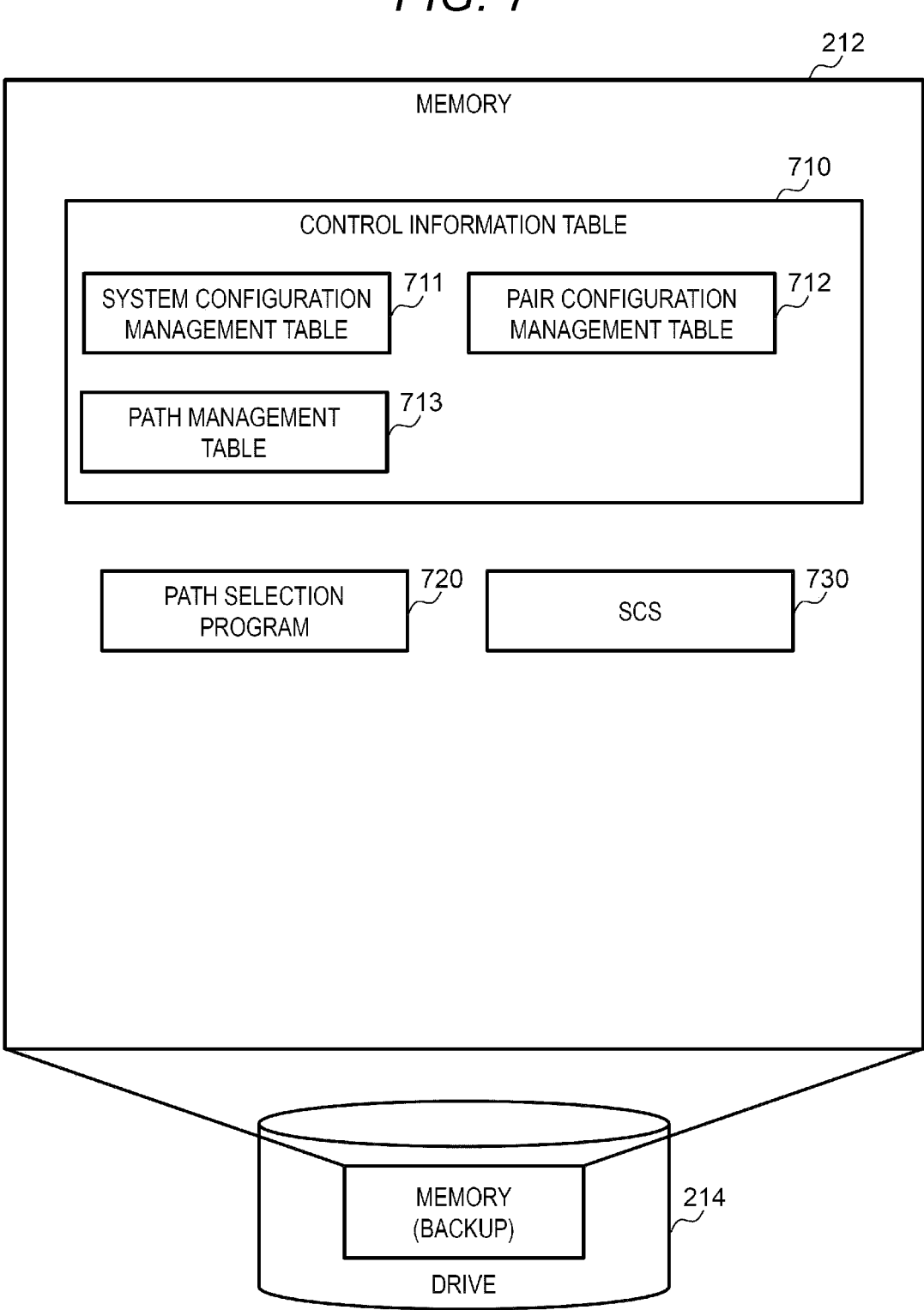
FIG. 7 is a diagram showing an example of data and programs stored in a memory.

FIG. 7 is a diagram showing an example of data and programs stored in the memory 212.

Information is read from the drive 214 to the memory 212. For example, various tables included in a control information table 710, the SCS 730, and the path selection program 720 are loaded on the memory 212 during execution of the process in which the tables, the SCS, and the path selection program are used, whereas at other times, the tables, the SCS, and the path selection program are stored in a non-volatile storage area such as the drive 214 in preparation for a power failure or the like. The control information table 710 includes a system configuration management table 711, a pair configuration management table 712, and a path management table 713.

FIG. 8 is a diagram showing an example of the system configuration management table 711.

The system configuration management table 711 includes a node configuration management table 810, a drive configuration management table 820, and a port configuration management table 830. For each site 201, there is a node configuration management table 810 related to a plurality of nodes 210 present in each site 201, and the node 210 has the drive configuration management table 820 and the port configuration management table 830 related to the drives 214 within the present node 210.

The node configuration management table 810 is provided for each site 201 and stores information indicating the configuration of the nodes 210 provided at the site 201 (such as a relationship between the nodes 210 and the drives 214). More specifically, the node configuration management table 810 stores, for each node 210, information such as a node ID 811, a state 812, a CPU usage rate 815, a memory usage rate 816, a drive ID list 813, and a port ID list 814.

The node ID 811 is an ID of the node 210. The state 812 indicates a state of the node 210 (for example, "Normal", "Warning", or "Failure"). The CPU usage rate 815 indicates a CPU usage rate of the node 210. The memory usage rate 816 indicates a memory usage rate of the node 210. The drive ID list 813 is a list of IDs of the drives 214 provided in the node 210. The port ID list 814 is a list of IDs of the ports 215 provided in the node 210.

The drive configuration management table 820 is provided for each node 210, and stores information indicating the configuration related to the drives 214 provided in the node 210. More specifically, the drive configuration management table 820 stores, for each drive 214, information such as a drive ID 821, a state 822, a BE bandwidth usage rate 824, a drive usage rate 825, and a size 823.

The drive ID 821 is an ID of the drive 214. The state 822 indicates a state of the drive 214. The BE bandwidth usage rate 824 indicates a usage rate of a communication bandwidth (back-end band) between the processor 211 and the drive 214. The drive usage rate 825 indicates a ratio of a used capacity to a capacity of the drive 214. The size 823 indicates the capacity of the drive 214.

The port configuration management table 830 is provided for each node 210, and stores information indicating the configuration related to the ports 215 provided in the node 210. More specifically, the port configuration management table 830 stores, for each port, information such as a port ID 831, a state 832, a NW bandwidth usage rate 834, and an address 833.

The port ID 831 is an ID of the port 215. The state 832 indicates a state of the port 215. The NW bandwidth usage rate 834 indicates a usage rate of a bandwidth of a network connected to the port 215 (a value of the NW bandwidth usage rate 834 may be an example of the performance of the port 215). The address 833 indicates an address on the network assigned to the port 215. A form of the address may be an Internet protocol (IP), a world wide name (WWN), a media access control (MAC) address, or the like.

FIG. 9 is a diagram showing an example of the pair configuration management table 712.

The pair configuration management table 712 includes a VOL management table 910, a pair management table 920, and a JNL management table 930.

The VOL management table 910 stores information indicating the configuration related to the VOL 102. More specifically, the VOL management table 910 stores, for each VOL 102, information such as a VOL ID 911, an owner node ID 912, a standby node ID 913, a size 914, and an attribute 915.

The VOL ID 911 is an ID of the VOL 102. The owner node ID 912 is the ID of the node 210 having an ownership of the VOL 102. The standby node ID 913 is the ID of the node 210 that takes over the process when the node 210 having the ownership of the SVOL fails. The size 914 indicates a capacity of the VOL 102.

The attribute 915 indicates an attribute of the VOL 102. "NML_VOL" means a normal VOL that is not used for the remote copy. "PVOL" means a primary VOL. "PJVOL" means a JVOL that stores the update differential data of the PVOL. Although not shown, the SVOL and the SJVOL are also included as the attributes.

The pair management table 920 stores information indicating the configuration related to the remote copy pair. More specifically, the pair management table 920 stores, for each consistency group, information such as a pair group ID 921, a PJVOL ID 922, a PVOL ID 923, an SJVOL ID 924, an SVOL ID 925, a PG-ID 927, and a state 926.

The pair group ID 921 is an ID of the consistency group. The PJVOL ID 922 is a list of IDs of PJVOLs belonging to the consistency group. The PVOL ID 923 is a list of IDs of PVOLs belonging to the consistency group. The SJVOL ID 924 is a list of IDs of an SJVOL 102JS belonging to the consistency group. The SVOL ID 925 is a list of IDs of an SVOL 102S belonging to the consistency group. The PG-ID 927 is an ID of a path group for each remote copy pair belonging to the consistency group. The state 926 indicates a state of each remote copy pair in the consistency group (for example, "PAIR", "COPY", or "SUSPEND"). The "PAIR" is a state in which writing to a PVOL 102P is periodically reflected in the SVOL 102S. The "COPY" is a state in which the initial copy is in progress. The "SUSPEND" is a pair suspension state (a state in which synchronization between the PVOL 102P and the SVOL 102S is not performed).

The JNL management table 930 stores information related to the JNL. More specifically, the JNL management table 930 stores, for each JNL, information such as a pair group ID 931, a JNL ID 932, a P/SVOL ID 933, a P/SVOL address 934, a size 935, and a cache segment ID 936.

The pair group ID 931 is an ID of the consistency group to which the JNL belongs. The JNL ID 932 is an ID of the JNL. The ID of the JNL corresponds to SEQ #, and is, for example, a serial number in the consistency group. That is, the ID of the JNL indicates a write order, and data in the JNL is stored in the SVOL 102S in the consistency group in accordance with the order of the ID of the JNL.

The P/SVOL ID 933 includes an ID of the PVOL 102P to which the data in the JNL is written and an ID of the SVOL 102S to which the data in the JNL is written. The P/SVOL address 934 includes a storage destination address of the data in the PVOL 102P to which the data in the JNL is written and a storage destination address of the data in the SVOL 102S to which the data in the JNL is written.

The size 935 indicates a size of the JNL. For example, one JNL includes one or a plurality of pieces of data. The cache segment ID 936 is an ID of a cache segment (one area in a cache provided in the memory 212) to which the data in the JNL is written.

FIG. 10 is a diagram showing an example of the path management table 713.

The path management table 713 is a table related to the path 60. The path management table 713 stores, for each path 60, information such as a PG-ID 1031, a P-ID 1034, protocol information 1035, a state 1036, an average response 1037, a local address 1032, and a destination address 1033.

The PG-ID 1031 is an ID of a path group to which the path 60 belongs. The P-ID 1034 is an ID of the path 60.

The protocol information 1035 is information indicating a communication protocol of the path 60. The communication protocol of the path 60 may be iSCSI, or may be a vendor-specific proprietary protocol in addition to Fibre Channel (FC) and NVMe over Fabrics (NVMe-oF).

The state 1036 indicates a state of the path 60. A predetermined value other than "Normal" may mean an abnormality related to the path 60. For example, "Failure" means a path failure.

The average response 1037 indicates an average response time in communication via the path 60. A value of the average response 1037 may be an example of the performance of the path 60.

The local address 1032 indicates an address of the initiator port of the path 60. The destination address 1033 indicates an address of a target port of the path 60.

Hereinafter, an example of a process performed in the embodiment will be described. In the following description, the remote copy pair 1 is taken as an example. The secondary node 210S having the ownership of the SVOL 1 in the remote copy pair 1 is the secondary node 210S1.

Figure 11:
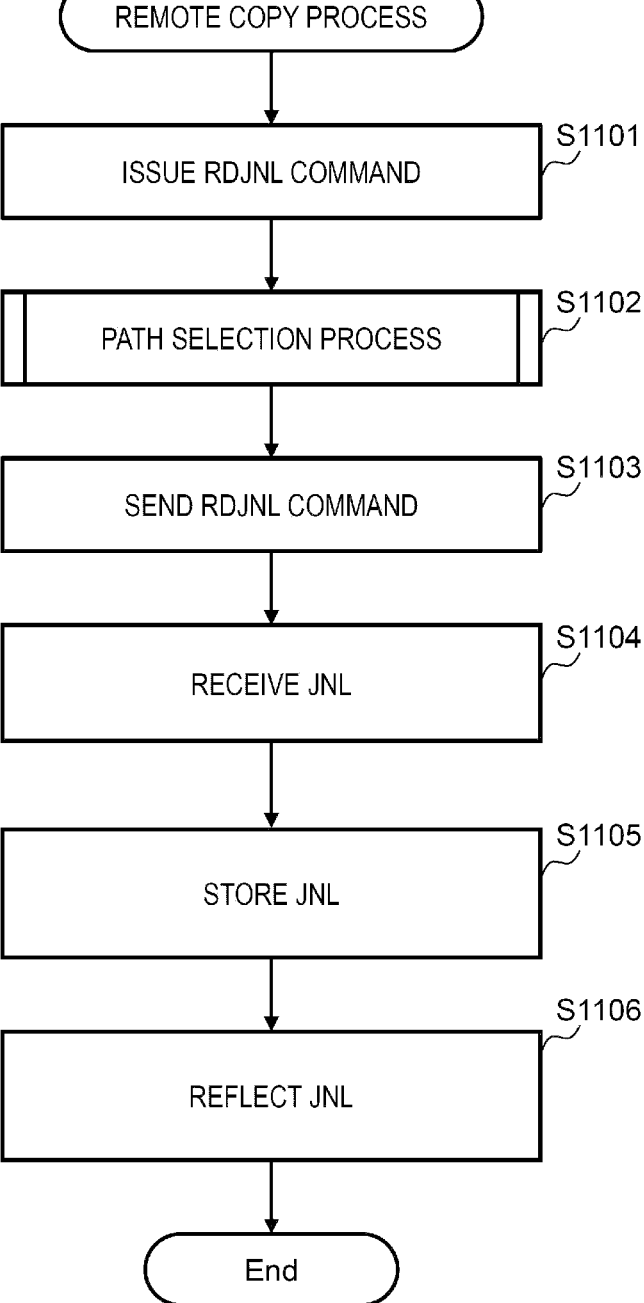
FIG. 11 is a diagram showing a flow of a remote copy process.

FIG. 11 is a diagram showing a flow of the remote copy process.

The SCS 1 (A) issues the RDJNL command (S1101). The path selection process is performed (S1102).

The SCS 1 (A) sends the RDJNL command to the primary storage system 100P via the path 60 selected in the path selection process of S1102 (S1103). In response to the RDJNL command, the SCS 1 (A) receives the JNL from the primary storage system 100P via the path 60 (S1104). The SCS 1 (A) stores the received JNL in SJVOL 1 (S1105).

The SCS 1 (A) reflects an unreflected JNL to the SVOL 1 in the order of SEQ #(S1106). That is, data in the unreflected JNL is stored in the SVOL 1.

Although details are omitted, in the remote copy process, the state 926 of a pair group including the remote copy pair 1, and values in the various tables are appropriately updated.

Figure 12:
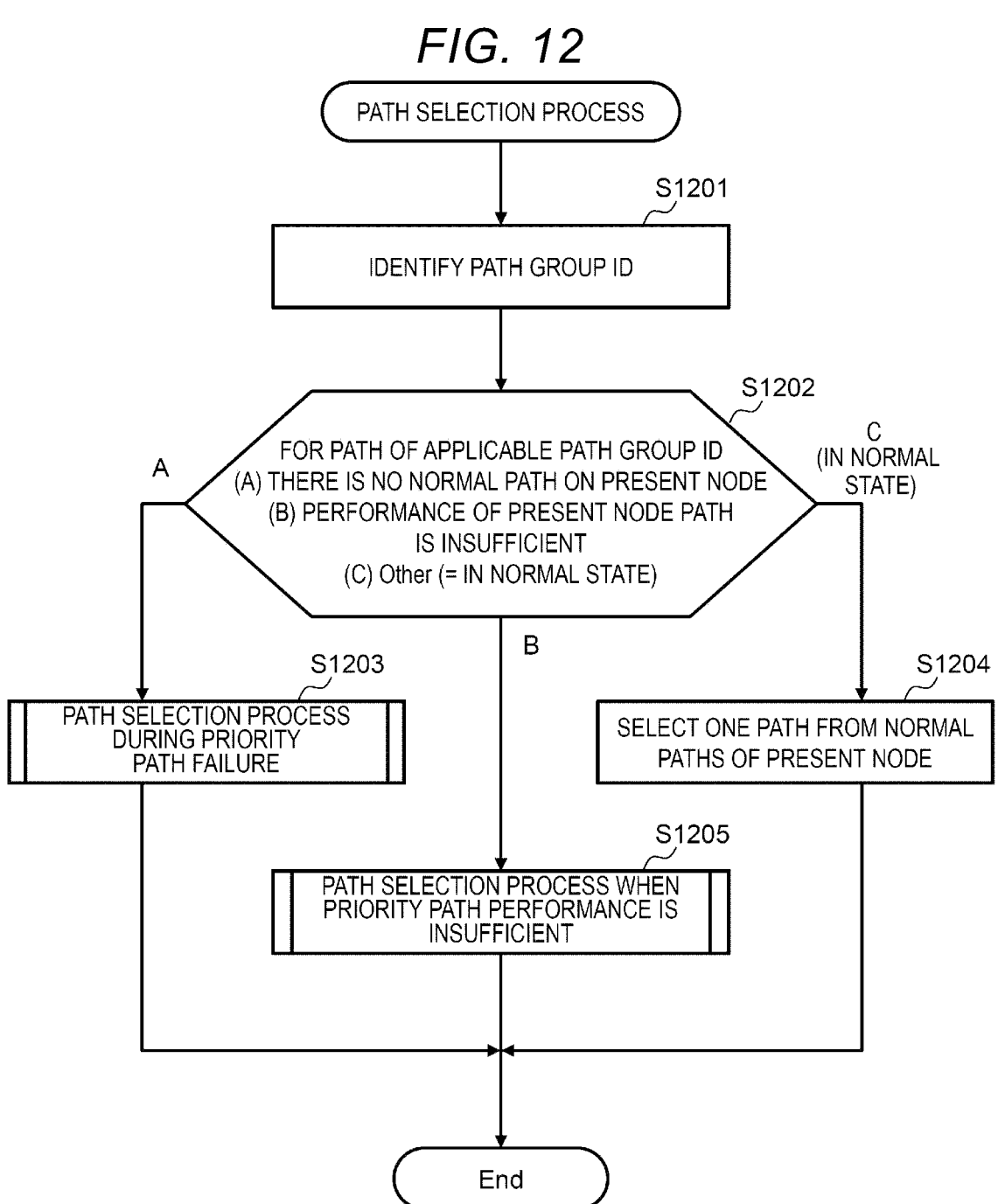
FIG. 12 is a diagram showing a flow of a path selection process.

FIG. 12 is a diagram showing a flow of the path selection process. In the description with reference to FIGS. 12 to 14, the remote copy pair 1 and the path selection program 1 are taken as an example, although when a fail-over from the SCS 1 (A) of the secondary node 210S1 to the SCS 1 (S) of the secondary node 210S2 occurs due to a node failure of the secondary node 210S1, the path selection process may be performed by the path selection program 2. Since the remote copy pair 1 is taken as an example, a connection destination of the dynamically generated path in the primary storage system 100P is the target port (that is, T1 or T2) of the primary node 210P having the PVOL 1 or the PVOL 1 (S). The address of the target port can be identified from the path management table 713.

The path selection program 1 identifies the path group ID: 1 corresponding to the remote copy pair 1 from the pair management table 920 (S1201). The path selection program 1 refers to the path management table 713 using the path group ID: 1 as a key, and determines which of the following (A) to (C) is applicable (S1202).

(A) There is no normal path (a path whose state 1036 is "Normal") in the secondary node 21051.

(B) The performance of the path of the secondary node 21051 (the path connected to the initiator port I1) is insufficient. That is, it is the same node as SCS 1 (A), but the performance of the path to be preferentially selected is insufficient.

(C) Neither (A) nor (B) is applicable.

The determination as to whether (A) is applicable may be made by determining whether the state 1036 of the paths 11 and 14 (the paths connected to I1 of the secondary node 21051) are both other than "Normal". If neither the path 11 nor the path 14 is "Normal", (A) is applicable. When (A) is applicable, the path selection program 1 performs the path selection process during a priority path failure (S1203).

The determination of whether (B) is applicable may be made by determining whether both the average responses 1037 of the path 11 and the path 14 (the paths connected to I1 of the secondary node 210S1) are equal to or greater than a threshold value (and/or whether the number of RDJNL commands sent per unit time is more than a threshold value). When both the average responses 1037 of the path 11 and the path 14 (the paths connected to I1 of the secondary node 210S1) are equal to or greater than the threshold value (and/or whether the number of RDJNL commands sent per unit time is more than the threshold value), (B) is applicable. When (B) is applicable, the path selection program 1 performs the path selection process when priority path performance is insufficient (S1205).

When (C) is applicable, the path selection program 1 selects the normal path 11 or the normal path 14 connected to I1 (S1204). In S1204, the normal path may be selected in a round-robin manner, or a normal path having the smallest value of the average response 1037 may be selected.

FIG. 13 is a diagram showing a flow of the path selection process during the priority path failure.

The path selection program 1 determines whether the secondary node 210S2 having the SCS 1 (S) has a normal path (S1301) The determination may be performed by the path selection program 1 collecting necessary information from the path selection program 2, or may be performed based on a shared table in which the path management tables 713 of all the secondary nodes 210S are shared by the respective secondary nodes 210S.

When a determination result of S1301 is true (S1301: YES), the path selection program 1 selects one normal path from the normal paths connected to the initiator port 12 of the secondary node 210S2 having the SCS 1 (S) (S1302). In S1302, the path 12 in the path group 1 is selected based on the path management table 713.

When the determination result of S1301 is false (S1301: NO), the path selection program 1 selects one normal path from the normal paths connected to the initiator port of another secondary node 210S (S1303). The "another secondary node 210S" in the paragraph is any secondary node 210S other than the secondary node 210S1 and the secondary node 21052. In S1303, the path 13 in the path group 1 is selected based on the path management table 713.

In S1301 to S1303, when there is no normal path, the path selection program 1 may dynamically generate a path. The connection destination of the dynamically generated path may be determined based on the destination address 1033 of the path management table 713. Specifically, for the remote copy pair 1, the connection destination of the dynamically generated path may be T1 of the primary node 210P1 having the PVOL 1, or T2 of the primary node 210P2 having the PVOL 1 (S).

In addition, before the determination in S1301, present-node port determination may be performed to determine whether the state 832 of I1 of the secondary node 210S1 is "Normal". S1301 may be performed when a result of the present-node port determination is false. When the result of the present-node port determination is true, the path selection program 1 may dynamically regenerate a path connecting to T1 or T2 from I1 for the remote copy pair 1.

Figure 14:
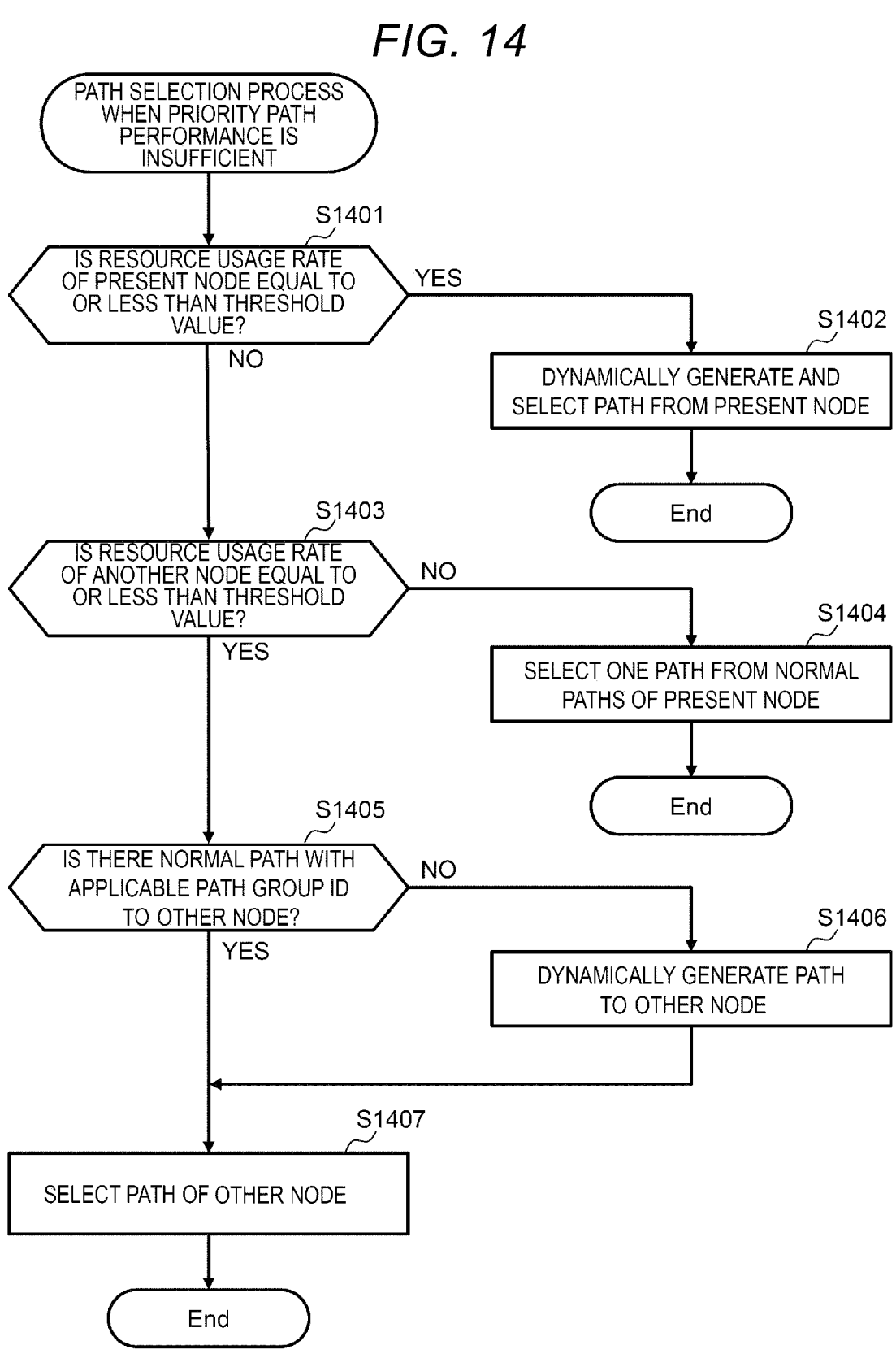
FIG. 14 is a diagram showing a flow of the path selection process when priority path performance is insufficient.

FIG. 14 is a diagram showing a flow of the path selection process when the priority path performance is insufficient.

The path selection program 1 determines whether the resource usage rate of the secondary node 210S1 is equal to or less than the threshold value (S1401). For the remote copy pair 1, the "resource usage rate" in the paragraph may be at least one of the CPU usage rate 815 of the secondary node 210S1, the memory usage rate 816 of the secondary node 210S1, a statistical value (for example, an average value) of the BE bandwidth usage rate 824 for the drive 214 of the secondary node 210S1, and the NW bandwidth usage rate 834 of I1.

When a determination result of S1401 is true (S1401: YES), the path selection program 1 dynamically generates a path connected to I1 and selects the path (S1402). That is, when the performance of the path 11 and the path 14 is insufficient but the resource usage rate of the secondary node 210S1 is equal to or less than the threshold value, the path connected to I1 is dynamically generated.

When the determination result of S1401 is false (S1401: NO), the path selection program 1 determines whether the resource usage rate of another secondary node 210S is equal to or less than the threshold value (S1403). The "another secondary node 210S" in the paragraph may be each secondary node 210S other than the secondary node 210S1. In the paragraph, the "resource usage rate" of the other secondary node 210S may be the same as the "resource usage rate" of the secondary node 210S1.

When the determination result of S1403 is false (S1403: NO), the path selection program 1 selects the path 11 or the path 14 from I1 (S1404). That is, when the performance of the path 11 and the path 14 is insufficient but the resource usage rate of the other secondary node 210S is more than the threshold value, there is a possibility that the advantage of selecting the path connected to the other secondary node 210S is low, and thus the path 11 or the path 14 is selected.

When the determination result of S1403 is true (S1403: YES), the path selection program 1 determines whether a normal path belonging to the path group 1 is connected to the other secondary node 210S based on the path management table 713 (S1405).

When a determination result of S1405 is false (S1405: NO), the path selection program 1 causes the path selection program 720 of the other secondary node 210S to dynamically generate a path connected to the initiator port of the other secondary node 210S (S1406), and selects the path (S1407). That is, when the performance of the path 11 and the path 14 is insufficient and the resource usage rate of the other secondary node 210S is equal to or less than the threshold value, but the path belonging to the path group 1 is not connected to the other secondary node 210S, the path connected to the initiator port of the other secondary node 210S is dynamically generated.

When the determination result of S1405 is true (S1405: YES), the path selection program 1 selects the normal path 12 or the path 13 connected to the other secondary node 210S in the path group 1 (S1407).

Second Embodiment

A second embodiment of the invention will be described. In this case, differences from the first embodiment will be mainly described, and the description of the common points with the first embodiment will be omitted or simplified.

Figure 15:
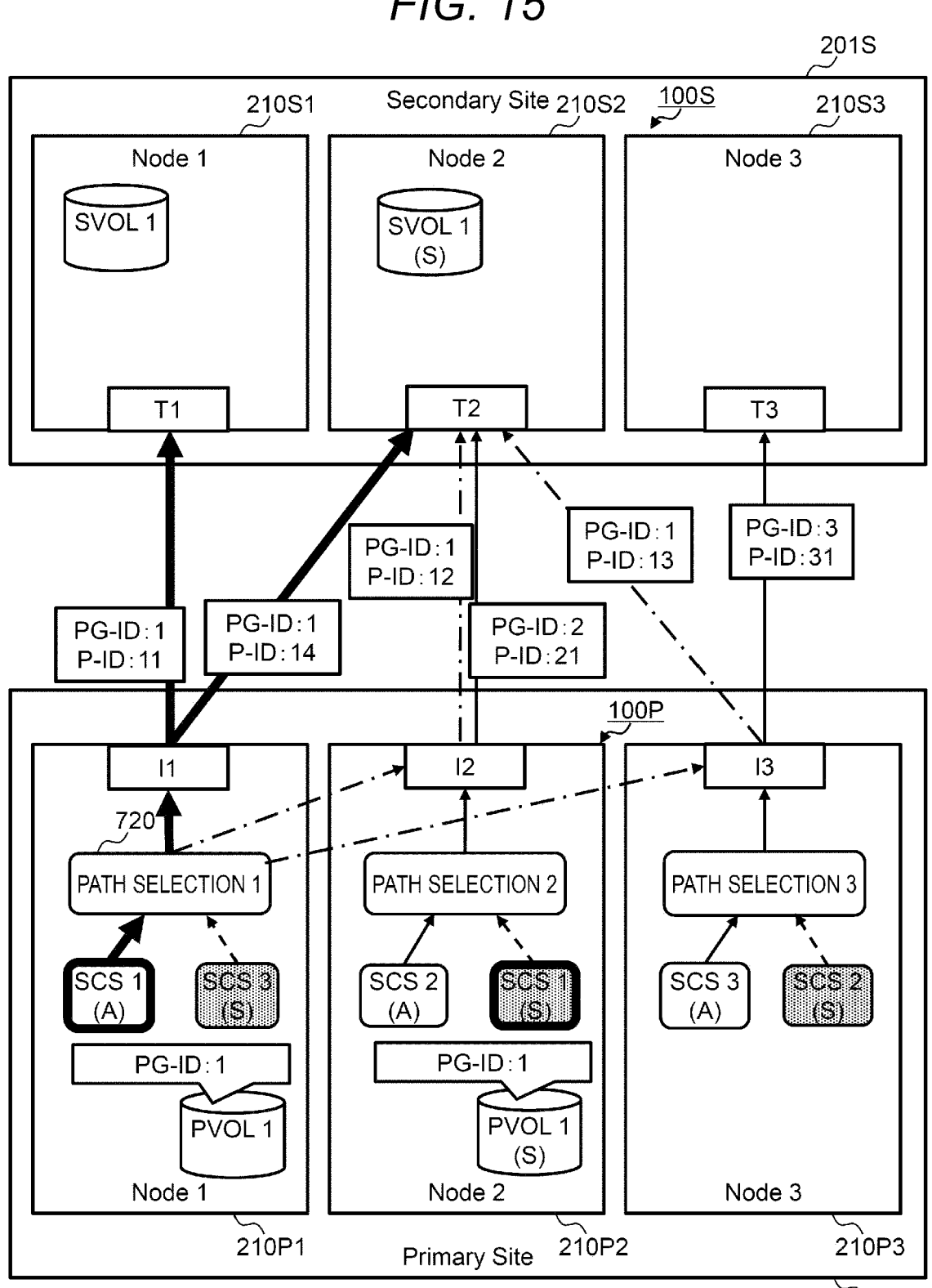
FIG. 15 is a schematic diagram showing an outline of a second embodiment according to the invention.

FIG. 15 is a schematic diagram showing an outline of the second embodiment according to the invention.

Whereas the pull-type asynchronous remote copy is adopted in the first embodiment, the push-type synchronous remote copy is adopted in the second embodiment. That is, the primary node 210P has the path selection program 720, and the path selection program 720 of the primary node 210P having the SCS (A) related to the remote copy pair (for example, the pair of the PVOL 1 and the SVOL 1) performs the path selection process. Regarding the remote copy pair, the port of the primary node 210P is the initiator port, and the port of the secondary node 210S is the target port. A WRJNL command (a write command of JNL) is sent from the SCS (A) of the primary node 210P to the secondary storage system 100S via a path selected by the path selection process. Accordingly, it is expected to reduce a performance decrease related to a push-type remote copy process.

Although one embodiment according to the invention has been described above, the embodiment is an example for describing the invention, and the scope of the invention is not limited to the embodiment. The invention can be implemented in various other aspects.

The above description can be summarized as follows. The following summary may include a supplementary description of the above description and a description of modifications. According to the first and second embodiments, the invention can be applied regardless of whether the remote copy is the pull type or the push type and regardless of whether the remote copy is the synchronous remote copy or the asynchronous remote copy. Therefore, in the following summary, a first storage system may be either the secondary storage system 100S or the primary storage system 100P, and a second storage system may be the primary storage system 100P when the first storage system is the secondary storage system 100S, and may be the secondary storage system 100S when the first storage system is the primary storage system 100P.

A storage system as the first storage system communicating with the second storage system includes a plurality of nodes each including an initiator port, a memory, a processor, and a VOL. There are a plurality of paths between the first storage system and the second storage system. For each of the plurality of paths, the path is a path that communicably connects any initiator port among the plurality of initiator ports provided in the plurality of nodes and any target port among one or a plurality of target ports provided in the second storage system. For one node or each of two or more nodes among the plurality of nodes, the node includes a first VOL forming a remote copy pair with a second VOL among one or a plurality of VOLs provided in the second storage system, and when sending a command for remote copy in the remote copy pair to the second storage system, the node selects, unless an abnormality related to the initiator port of the node is detected, a path connected to the initiator port of the node, and sends the command via the selected path. Accordingly, it is not necessary to transfer the command between the nodes when sending the command, and therefore it can be expected to reduce a performance decrease in the remote copy. In addition, "one or two or more nodes among the plurality of nodes" may mean that the plurality of nodes may include a so-called spare node other than "one or two or more nodes".

For each of the two or more nodes, a processor of the node may execute SCS for controlling input/output (I/O) with respect to the VOL. There are one or a plurality of SCS groups, and for the one SCS group or each of the plurality of SCS groups, the SCS group may include one SCS (A), which is an active SCS, and one or a plurality of SCSs (S), each of which is a standby SCS. The one SCS (A) and the one or plurality of SCSs (S) may be arranged in two or more different nodes among the plurality of nodes. When a failure occurs in the node including the SCS (A), a fail-over may be performed such that any of the SCSs (S) belonging to the SCS group becomes the SCS (A) in place of the SCS (A) in the SCS group. The node that selects the path for the remote copy pair in which the remote copy is performed may be the node including the SCS (A) that sends the command for the remote copy. Therefore, for each of the two or more nodes, the initiator port of the node is used for sending the command from the SCS (A) in the node, and therefore, presence or absence of an abnormality related to the initiator port of each node can be found. Accordingly, it can be found before path selection whether a path connected to another node is usable without selecting a path connected to the node including the SCS (A) and a path connected to the other node in a round-robin manner.

For example, any one of the two or more nodes may be a first node (for example, the secondary node 210S1). Any SCS group other than a first SCS group including a first SCS (A) (for example, the SCS1 (A)) provided in the first node may be a second SCS group. A node including a second SCS (A) (for example, the SCS2 (A) or the SCS3 (A)) in the second SCS group may be a second node (for example, the secondary node 210S2 or the secondary node 210S3). The remote copy pair in which the remote copy is performed by the first SCS (A) may be a first remote copy pair (for example, the remote copy pair 1). When an abnormality related to the initiator port (for example, I1) of the first node is detected, the node including the first SCS (A) may select, unless an abnormality related to the initiator port (for example, I2 or I3) of the second node is detected by the second node, a second path (for example, the path 12 or the path 13) connected to the initiator port of the second node, and send the command for the remote copy in the first remote copy pair via the second path. Accordingly, it is possible to avoid occurrence of the abnormality when the path connected to the second node is selected, and thus it is expected to reduce the performance decrease in the remote copy.

The second node may be a node (for example, the secondary node 210S2) having a first SCS (S) (for example, the SCS 1 (S)) in the first SCS group. Accordingly, it can be expected that the first SCS (S) takes over a process in place of the first SCS (A) and continues the remote copy without transferring the command between the second node and the other node. Specifically, for example, the second node may have a standby first VOL which is a VOL storing redundant data of data stored in the first VOL forming the first remote copy pair. The command for the remote copy in the first remote copy pair, sent via the second path may be a command for the remote copy between the standby first VOL and the second VOL in the first remote copy pair.

Any SCS group other than the first SCS group and the second SCS group may be a third SCS group. A node including a third SCS (A) (for example, the SCS3 (A)) in the third SCS group may be a third node (for example, the secondary node 210S3). When the abnormality related to the initiator port of the first node is detected, if the abnormality related to the initiator port of the second node is detected by the second node, the node including the first SCS (A) may select, unless an abnormality related to the initiator port of the third node is detected by the third node, a third path connected to the initiator port of the third node, and send the command for the remote copy in the first remote copy pair via the third path. Accordingly, it is possible to avoid occurrence of the abnormality when the path connected to the third node is selected, and thus it is expected to reduce the performance decrease in the remote copy.

The abnormality related to the initiator port may be a failure of the node including the initiator port, a failure of the initiator port, a failure of the path connected to the initiator port, performance of the initiator port being equal to or less than a threshold value, or performance of the path connected to the initiator port being equal to or less than a threshold value.

The abnormality related to the initiator port of the first node may be that the performance of the initiator port is equal to or less than a threshold value, or that the performance of the path connected to the initiator port is equal to or less than a threshold value. In that case, the second node may be a node whose resource usage rate is equal to or less than a threshold value. That is, when the abnormality related to the initiator port of the first node is detected, and there is the second node as another node whose resource usage rate is equal to or less than the threshold value, the path connected to the initiator port of the second node may be selected. Since there is a margin in the resource related to the second node to which the selected path is connected, it can be expected to reduce the performance decrease in the remote copy.

For the one node or each of the two or more nodes, the abnormality related to the initiator port of the node may be that the performance of the path connected to the initiator port is equal to or less than a threshold value, and when a resource usage rate related to the node is equal to or less than a threshold value, the node may dynamically generate a path connected to the initiator port and select the generated path. Accordingly, even if the performance of the path connected to the node is low, when there is a margin in the resource related to the node, the path connected to the node is dynamically generated and the path is selected, and thus it is expected to reduce the performance decrease in the remote copy.

When the abnormality related to the initiator port of the node or the initiator port of another node is detected and the path connected to the initiator port of the node needs to be selected (further, when the path (for example, a path that is normal and has sufficient performance) connected to the initiator port of the node is insufficient), the path selected by the node may be a path dynamically generated by the node. Accordingly, it can be expected to reduce the performance decrease in the remote copy. When the abnormality related to the initiator port is resolved, the dynamically generated path may be deleted by the node that dynamically generates the path. Accordingly, it can be expected to avoid management burden or excess of resources caused by leaving unnecessary paths.

In a case in which the plurality of paths are connected to the initiator port of the node, when sending the command to the second storage system, the node may select a path from the plurality of paths in a round-robin manner. Accordingly, it is possible to avoid a load concentration of the path while eliminating the need for command transfer between the nodes, and thus it is expected to further reduce the performance decrease in the remote copy.

In a case in which the plurality of paths are connected to the initiator port of the node, when sending the command to the second storage system, the node may identify a statistically best path among the plurality of paths based on statistics for each of the plurality of paths, and select the identified path. Accordingly, it is possible to maintain selection of the best path while eliminating the need for command transfer between the nodes, and thus it is expected to further reduce the performance decrease in the remote copy.

When sending the command for the remote copy in the remote copy pair to the second storage system, the node may select, unless the abnormality related to the initiator port of the node is detected, a path connected to the initiator port from a path group associated with the remote copy pair and including the path connected to the initiator port. It is possible to associate different path groups with different remote copy pairs, and accordingly, it is possible to manage paths between the same initiator port and target port as different paths. For example, the path 12 belonging to the path group 1 associated with the remote copy pair 1 and a path 21 belonging to the path group 2 associated with another remote copy pair (a pair of a PVOL 5 and an SVOL 7) can be managed as the paths connecting I2 and T2. In addition, path options are narrowed down for each remote copy pair. As a result, it is expected to reduce the performance decrease in the remote copy.

In the above description, whether each of the first storage system and the second storage system is the primary storage system or the secondary storage system may be different depending on the remote copy pair. That is, the storage system having the PVOL may be the primary storage system, and the storage system having the SVOL may be the secondary storage system.

What is claimed is:

1. A storage system as a first storage system that communicates with a second storage system, the storage system comprising:

a plurality of nodes each including an initiator port, a memory, a processor, and a logical volume (VOL), wherein there are a plurality of paths, and for each of the plurality of paths, the path is a path that communicably connects any initiator port among the plurality of initiator ports provided in the plurality of nodes and any target port among one or a plurality of target ports provided in the second storage system, and wherein for one node or each of two or more nodes among the plurality of nodes, wherein the node includes a first VOL forming a remote copy pair with a second VOL among one or a plurality of VOLs provided in the second storage system, and wherein when sending a command for remote copy in the remote copy pair to the second storage system, the node selects, unless an abnormality related to the initiator port of the node is detected, a path connected to the initiator port of the node, and sends the command via the selected path, wherein for each of the two or more nodes, a processor of the node executes storage control software (SCS) for controlling input/output (I/O) with respect to the VOL, wherein there are one or a plurality of SCS groups, and for the one SCS group or each of the plurality of SCS groups, the SCS group includes one SCS (A), which is an active SCS, and one or a plurality of SCSs(S), each of which is a standby SCS, the one SCS (A) and the one or plurality of SCSs(S) are arranged in two or more different nodes among the plurality of nodes, and when a failure occurs in the node including the SCS (A), a fail-over is performed such that any of the SCSs(S) belonging to the SCS group becomes the SCS (A) in place of the SCS (A) in the SCS group, and wherein the node that selects the path for the remote copy pair in which the remote copy is performed is the node including the SCS (A) that sends the command for the remote copy.

2. The storage system according to claim 1, wherein any node of the two or more nodes is a first node, wherein any SCS group other than a first SCS group including a first SCS (A) provided in the first node is a second SCS group, wherein the node including a second SCS (A) in the second SCS group is a second node, wherein the remote copy pair in which the remote copy is performed by the first SCS (A) is a first remote copy pair, and wherein when an abnormality related to the initiator port of the first node is detected, the node including the first SCS (A) selects, unless an abnormality related to the initiator port of the second node is detected by the second node, a second path connected to the initiator port of the second node, and sends the command for the remote copy in the first remote copy pair via the second path.

3. The storage system according to claim 2, wherein the second node is a node including a first SCS(S) in the first SCS group.

4. The storage system according to claim 3, wherein the second node includes a standby first VOL which is a VOL storing redundant data of data stored in the first VOL forming the first remote copy pair, and the command for the remote copy in the first remote copy pair, sent via the second path is a command for the remote copy between the standby first VOL and the second VOL in the first remote copy pair.

5. The storage system according to claim 3, wherein any SCS group other than the first SCS group and the second SCS group is a third SCS group, the node including a third SCS (A) in the third SCS group is a third node, and when the abnormality related to the initiator port of the first node is detected, if the abnormality related to the initiator port of the second node is detected by the second node, the node including the first SCS (A) selects, unless an abnormality related to the initiator port of the third node is detected by the third node, a third path connected to the initiator port of the third node, and sends the command for the remote copy in the first remote copy pair via the third path.

6. The storage system according to claim 2, wherein the abnormality related to the initiator port of the first node is that the performance of the initiator port is equal to or less than a threshold value, or that the performance of the path connected to the initiator port is equal to or less than a threshold value, and the second node is a node whose resource usage rate is equal to or less than a threshold value.

7. The storage system according to claim 1, wherein the abnormality related to the initiator port is a failure of the node including the initiator port, a failure of the initiator port, a failure of the path connected to the initiator port, performance of the initiator port being equal to or less than a threshold value, or performance of the path connected to the initiator port being equal to or less than a threshold value.

8. The storage system according to claim 1, wherein for the one node or each of the two or more nodes, the abnormality related to the initiator port of the node is that the performance of the path connected to the initiator port is equal to or less than a threshold value, and when a resource usage rate related to the node is equal to or less than a threshold value, the node dynamically generates a path connected to the initiator port and select the generated path.

9. The storage system according to claim 1, wherein when the abnormality related to the initiator port of the node or the initiator port of another node is detected and the path connected to the initiator port of the node needs to be selected, the path selected by the node is a path dynamically generated by the node.

10. The storage system according to claim 9, wherein when the abnormality related to the initiator port is resolved, the dynamically generated path is deleted by the node that dynamically generates the path.

11. He storage system according to claim 1, wherein in a case in which the plurality of paths are connected to the initiator port of the node, when sending the command to the second storage system, the node selects a path from the plurality of paths in a round-robin manner.

12. The storage system according to claim 1, wherein in a case in which the plurality of paths are connected to the initiator port of the node, when sending the command to the second storage system, the node identifies a statistically best path among the plurality of paths based on statistics for each of the plurality of paths, and selects the identified path.

13. The storage system according to claim 1, wherein when sending the command for the remote copy in the remote copy pair to the second storage system, the node selects, unless the abnormality related to the initiator port of the node is detected, a path connected to the initiator port from a path group associated with the remote copy pair and including the path connected to the initiator port.

14. A path selection method to be performed by a storage system that is a storage system as a first storage system communicating with a second storage system and that includes a plurality of nodes, the method comprising:

when one node or any node of two or more nodes among the plurality of nodes sends a command for remote copy in a remote copy pair to the second storage system, selecting, by the node, unless an abnormality related to an initiator port of the node is detected, a path connected to the initiator port; and sending the command by the node via the selected path, wherein there are a plurality of paths, and for each of the plurality of paths, the path is a path that communicably connects any initiator port among the plurality of initiator ports provided in the plurality of nodes and any target port among one or a plurality of target ports provided in the second storage system,

wherein for the one node or each of the two or more nodes, the node includes a first VOL, and wherein the remote copy pair is a pair including the first VOL and a second VOL among one or a plurality of VOLs provided in the second storage system, wherein for each of the two or more nodes, a processor of the node executes storage control software (SCS) for controlling input/output (I/O) with respect to the VOL, wherein there are one or a plurality of SCS groups, and for the one SCS group or each of the plurality of SCS groups, the SCS group includes one SCS (A), which is an active SCS, and one or a plurality of SCSs(S), each of which is a standby SCS, the one SCS (A) and the one or plurality of SCSs(S) are arranged in two or more different nodes among the plurality of nodes, and when a failure occurs in the node including the SCS (A), a fail-over is performed such that any of the SCSs(S) belonging to the SCS group becomes the SCS (A) in place of the SCS (A) in the SCS group, and wherein the node that selects the path for the remote copy pair in which the remote copy is performed is the node including the SCS (A) that sends the command for the remote copy.

\* \* \* \* \*